(12) United States Patent
Awane et al.

(10) Patent No.: US 8,294,432 B2
(45) Date of Patent: Oct. 23, 2012

(54) POWER CONVERTER

(75) Inventors: Kazutoshi Awane, Chiyoda-ku (JP); Masaki Yamada, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 382 days.

(21) Appl. No.: 12/766,628

(22) Filed: Apr. 23, 2010

(65) Prior Publication Data

US 2011/0127838 A1 Jun. 2, 2011

(30) Foreign Application Priority Data

Nov. 27, 2009 (JP) .................................. 2009-270112

(51) Int. Cl.
*H02J 1/00* (2006.01)
(52) U.S. Cl. ..................................... 323/207; 363/56.02
(58) Field of Classification Search .................. 323/207; 363/56.02, 56.03, 56.04
See application file for complete search history.

(56) References Cited

U.S. PATENT DOCUMENTS 6,693,409 B2 * 2/2004 Lynch et al. .................. 323/208

FOREIGN PATENT DOCUMENTS

| JP | 2000-116126 A | 4/2000 |
| JP | 2009-095160 A | 4/2009 |

* cited by examiner

*Primary Examiner* — Shawn Riley
(74) *Attorney, Agent, or Firm* — Sughrue Mion, PLLC

(57) ABSTRACT

A power converter includes an inverter circuit for superimposing a generated voltage on an AC input voltage, a diode bridge full-wave rectifying circuit connected to the inverter circuit, smoothing capacitors connected between DC output terminals of the rectifying circuit, short-circuit switches connected to the rectifying circuit, a rectification mode changing circuit connected to the rectifying circuit, a short-circuit switch control circuit for maintaining the short-circuit switches in an on state in a short-circuit phase range, a rectification mode control circuit for maintaining the rectification mode changing circuit in an off state in the short-circuit phase range and an inverter control circuit for PWM-controlling the inverter circuit so that an output voltage of the rectifying circuit follows a target output voltage when the rectification mode changing circuit is in the off state.

23 Claims, 27 Drawing Sheets

FIG. 18
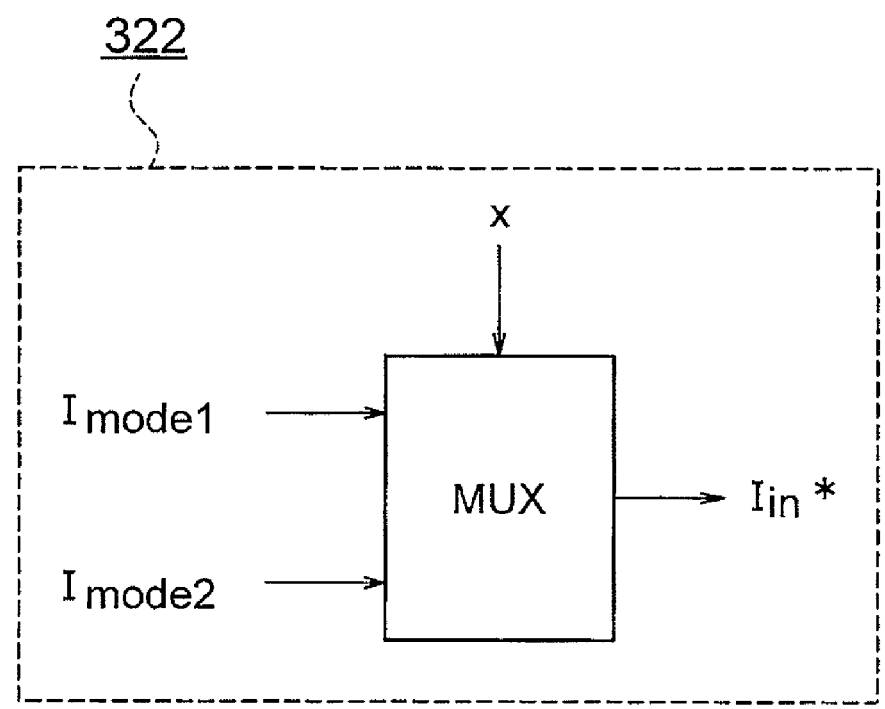
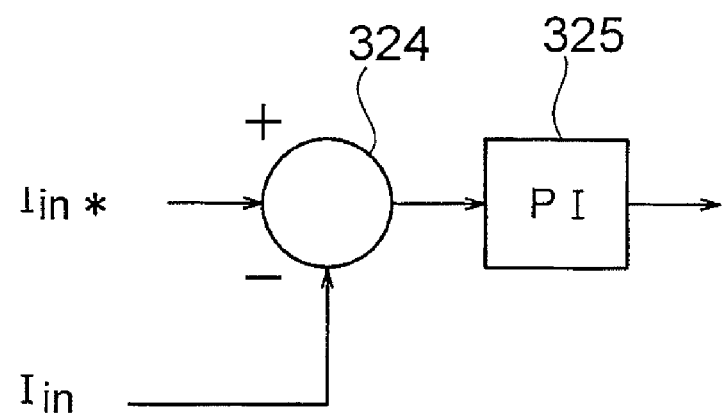

FIG. 22
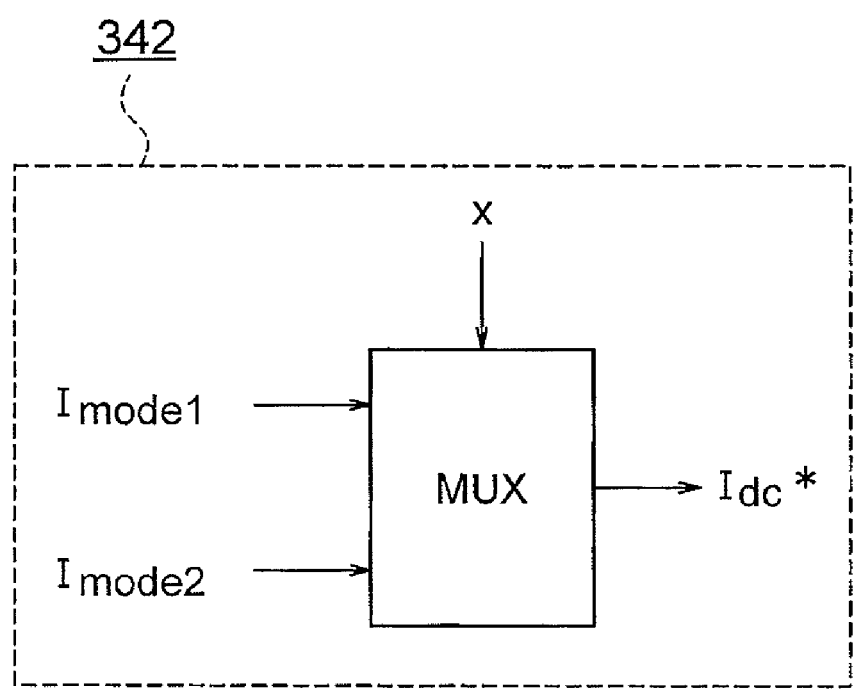
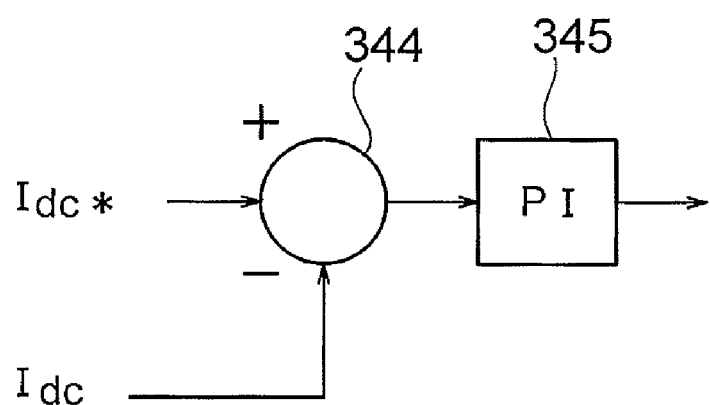

POWER CONVERTER

BACKGROUND OF THE INVENTION

1. Field of the Invention

The present invention relates to a power converter which includes an inverter circuit for improving an input power factor and converts AC power into DC power.

2. Description of the Related Art

In a conventional power converter, an inverter circuit (single-phase inverter) is connected in series to a rectifying circuit for rectifying an AC input in a subsequent stage of the rectifying circuit; and a smoothing capacitor is connected through a rectifying diode to the inverter circuit in a subsequent stage of the inverter circuit. Further, a short-circuit switch is provided to bypass the smoothing capacitor, and an output of the inverter circuit is controlled based on a current command so that a DC voltage of the smoothing capacitor follows a target voltage and an input power factor is improved (see, for example, JP 2009-095160 A).

However, the conventional technology has the following problems. In the conventional power converter, it is necessary to output, from the inverter circuit, a difference between an AC input voltage and an output voltage of the power converter. Therefore, when the output voltage is to be increased, a turn-on time of the short-circuit switch for charging the inverter circuit lengthens to increase a loss of the short-circuit switch. In addition, a DC voltage of the inverter circuit increases, and hence current control precision reduces and noise increases.

Semiconductor switch elements used in the inverter circuit require large withstanding voltages, and hence there is a problem that losses of the semiconductor switch elements increase.

When the number of single-phase inverters connected in series is increased in order to avoid the problem, a circuit structure and control are complicated. When a current-limiting reactor is increased in size, a large circuit size is required.

SUMMARY OF THE INVENTION

The present invention has been made to solve the problems as described above, and therefore, it is an object of the present invention to provide a power converter for controlling an output of an inverter circuit based on a current command so as to improve an input power factor, with which power loss and noise may be reduced, a large current-limiting circuit is not required, and a reduction in device structure size may be promoted.

A power converter according to the present invention includes: an AC input power supply including a first terminal and a second terminal; an inverter circuit including an input terminal connected to the first terminal of the AC input power supply, an output terminal, and a DC voltage source which is charged and discharged based on a PWM-controlled current flowing through the DC voltage source, the inverter circuit superimposing a generated voltage, which is a discharge voltage of the DC voltage source, on an AC input voltage of the AC input power supply; a reactor connected in series in one of a preceding stage and a subsequent stage of the inverter circuit, for limiting a current; a rectifying circuit including a first AC input terminal connected to the output terminal of the inverter circuit, a second AC input terminal connected to the second terminal of the AC input power supply, a first DC output terminal, and a second DC output terminal; a first smoothing capacitor and a second smoothing capacitor which are connected in series with each other between the first DC output terminal and the second DC output terminal of the rectifying circuit; a first short-circuit switch connected between the first AC input terminal and the second DC output terminal of the rectifying circuit; a second short-circuit switch connected between the second AC input terminal and the second DC output terminal of the rectifying circuit; a rectification mode changing circuit including one end connected to one of the first AC input terminal and the second AC input terminal of the rectifying circuit and another end connected to a connection point between the first smoothing capacitor and the second smoothing capacitor; a short-circuit switch control circuit for generating a short-circuit switch control signal based on the AC input voltage of the AC input power supply, the generated voltage of the DC voltage source of the inverter circuit, a voltage of the first smoothing capacitor, and a voltage of the second smoothing capacitor to control an on state and an off state of each of the first short-circuit switch and the second short-circuit switch based on the short-circuit switch control signal, the short-circuit switch control circuit generating the short-circuit switch control signal to maintain the first short-circuit switch and the second short-circuit switch in the on state in a short-circuit phase range in which a phase of the AC input voltage is within plus or minus a predetermined phase relative to zero; a rectification mode control circuit for generating a rectifying switch control signal to control an on state and an off state of the rectification mode changing circuit based on the rectifying switch control signal; and an inverter control circuit for generating an inverter switch control signal based on the AC input voltage and an AC input current of the AC input power supply, the voltage of the first smoothing capacitor, the voltage of the second smoothing capacitor, the short-circuit switch control signal from the short-circuit switch control circuit, and the rectifying switch control signal from the rectification mode control circuit to PWM-control the AC input current flowing through the inverter circuit based on the inverter switch control signal so that an output voltage from the rectifying circuit follows a target output voltage and an input power factor from the AC input power supply is adjusted to 1.

According to the power converter of the present invention, the power loss and noise are reduced, the large current-limiting circuit is not required, and the size reduction of the device structure may be promoted.

BRIEF DESCRIPTION OF THE DRAWINGS

In the accompanying drawings:

FIG. 18 illustrates another structure of the inverter control circuit of the power converter according to the first embodiment of the present invention;

FIG. 22 illustrates still another structure of the inverter control circuit of the power converter according to the first embodiment of the present invention;

DETAILED DESCRIPTION OF THE PREFERRED EMBODIMENTS

Hereinafter, preferred embodiments of a power converter according to the present invention are described with reference to the attached drawings.

First Embodiment

Figure 1:
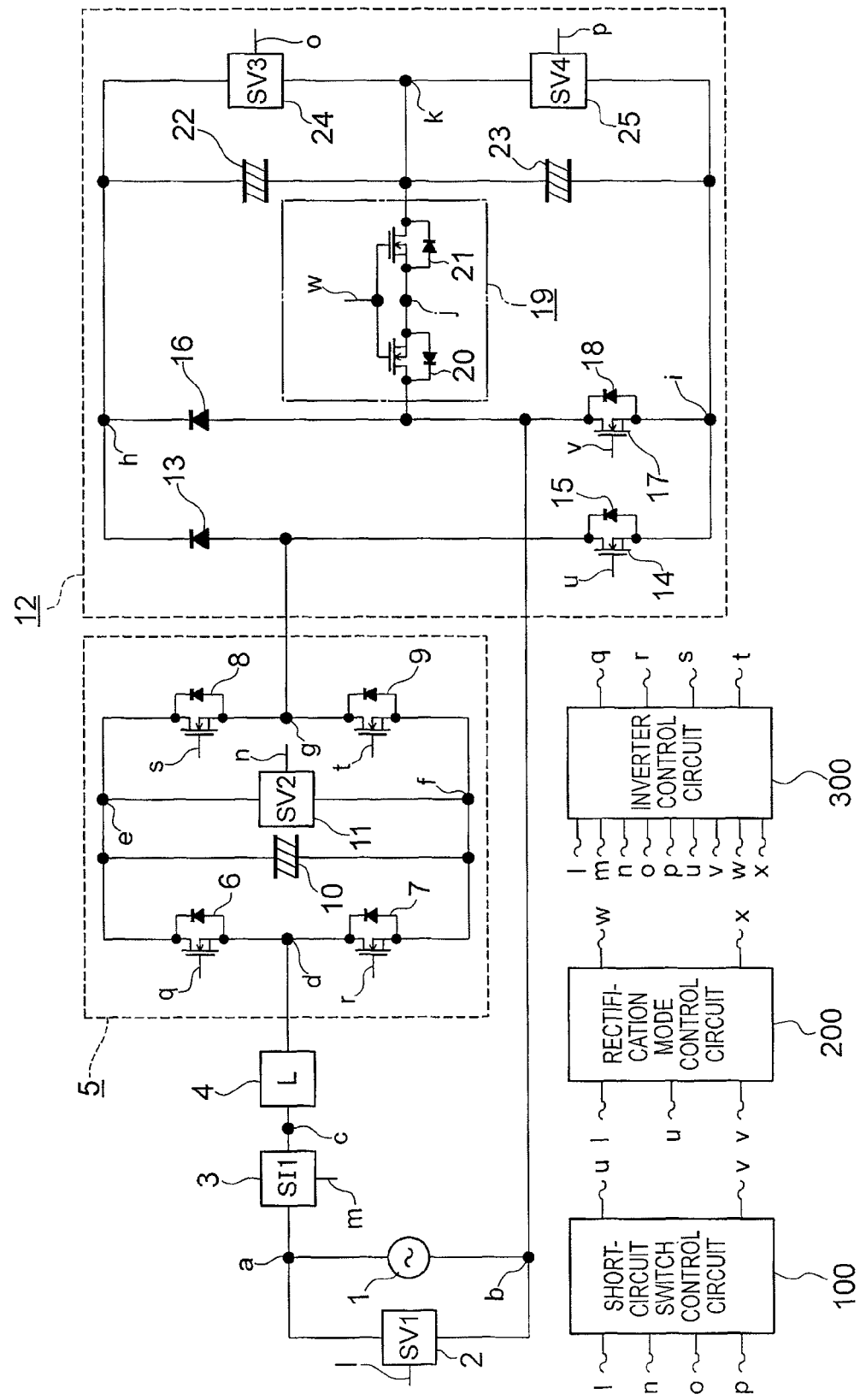
FIG. 1 is a circuit diagram illustrating a structure of a power converter according to a first embodiment of the present invention.

A power converter according to a first embodiment of the present invention is described with reference to FIGS. 1 to 23 and 27. FIG. 1 is a circuit diagram illustrating a structure of the power converter according to the first embodiment of the present invention. Hereinafter, the same reference symbols in the respective drawings indicate the same or corresponding portions.

In FIG. 1, the power converter according to the first embodiment of the present invention includes an AC input power supply 1 (hereinafter, simply referred to as AC power supply 1), a voltage detection circuit (SV1) 2, a current detection circuit (SI1) 3, a reactor (L) 4, an inverter circuit 5, a diode bridge full-wave rectifying circuit 12, a short-circuit switch control circuit 100, a rectification mode control circuit 200, and an inverter control circuit 300.

The AC power supply 1 is connected to the voltage detection circuit 2 and the current detection circuit 3 at a node "a". The current detection circuit 3 is connected to the reactor 4 at a node "c". One end of the inverter circuit 5 is connected to a node "d" provided in a subsequent stage of the reactor 4. Another end of the inverter circuit 5 is connected to the rectifying circuit 12 at a node "g".

The inverter circuit 5 includes: a single-phase inverter having semiconductor switch elements 6, 7, 8, and 9 and a DC voltage source 10; and a voltage detection circuit (SV2) 11. Each of the semiconductor switch elements 6, 7, 8, and 9 is a metal oxide semiconductor field effect transistor (MOSFET) in which a diode is provided between a source and a drain or an insulated gate bipolar transistor (IGBT) in which diodes are reversely connected in parallel.

The rectifying circuit 12 includes rectifying diodes 13, 15, 16, and 18, short-circuit switches 14 and 17, a rectification mode changing circuit 19, smoothing capacitors 22 and 23, a voltage detection circuit (SV3) 24, and a voltage detection circuit (SV4) 25. The rectification mode changing circuit 19 includes rectification mode changing switches 20 and 21.

The short-circuit switch 14 which is a semiconductor switch element and the rectifying diode 13 are connected in series at the node "g". The short-circuit switch 17 which is a semiconductor switch element and the rectifying diode 16 are connected in series at a node "b" and connected to the AC power supply 1 and the voltage detection circuit 2.

The smoothing capacitors 22 and 23 are connected in series at a node "k" to connect one ends thereof to each other. Another end of the smoothing capacitor 22 is connected to the rectifying diodes 13 and 16 at a node "h". Another end of the smoothing capacitor 23 is connected to the short-circuit switches 14 and 17 at a node "i".

The rectification mode changing switches 20 and 21 which are included in the rectification mode changing circuit 19 and are semiconductor switch elements, are connected in series at a node "j". One end of the rectification mode changing switch 20 is connected to the node "b". One end of the rectification mode changing switch 21 is connected to the node "k". The voltage detection circuit 24 is connected to the nodes "h" and "k". The voltage detection circuit 25 is connected to the nodes "k" and "i".

Figure 2:
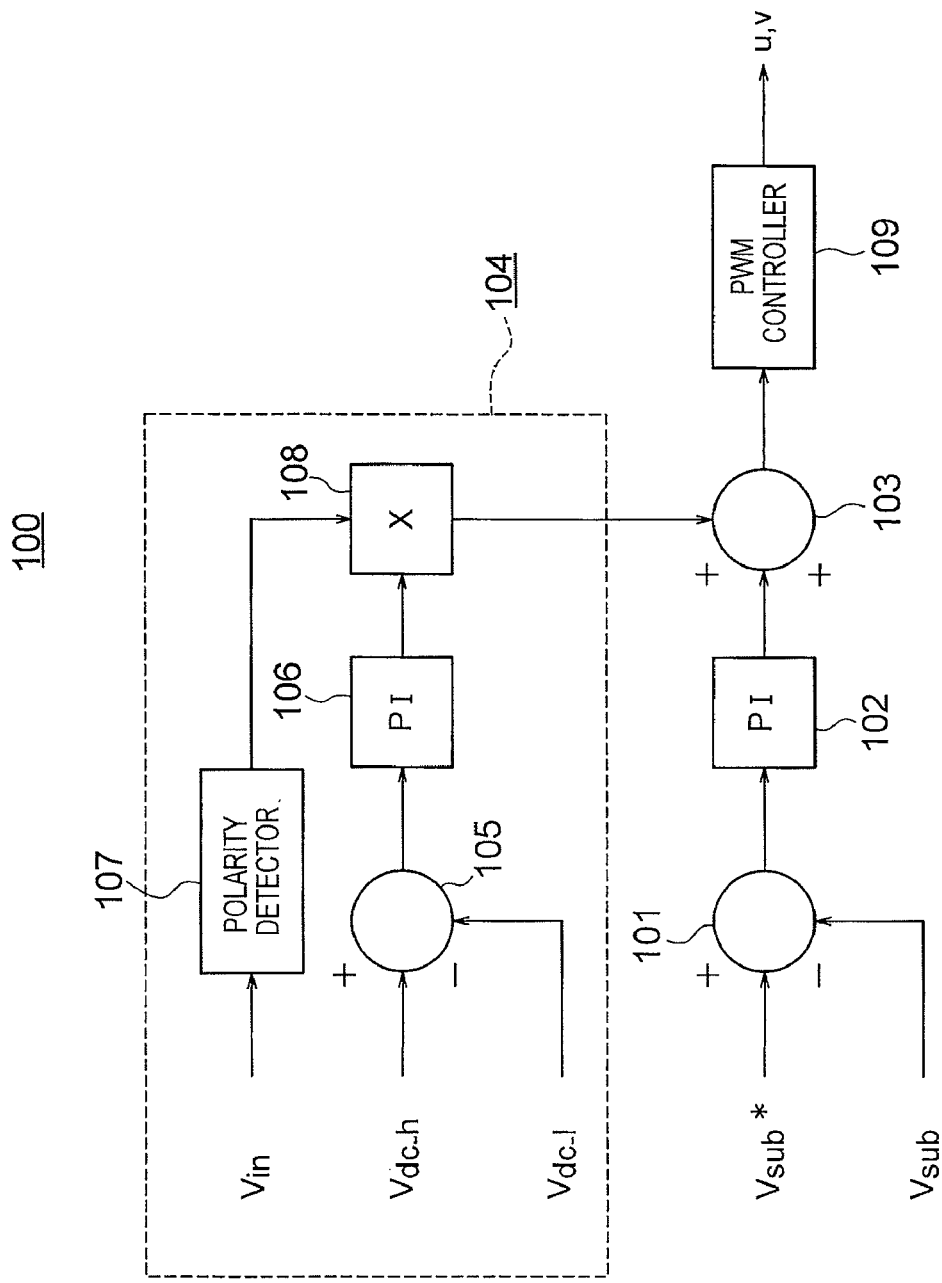
FIG. 2 illustrates a structure of a short-circuit switch control circuit of the power converter according to the first embodiment of the present invention.

FIG. 2 illustrates a structure of the short-circuit switch control circuit of the power converter according to the first embodiment of the present invention.

In FIG. 2, the short-circuit switch control circuit 100 includes a subtracter 101, a PI controller (PI) 102, an adder 103, a corrector 104, and a PWM controller 109. The corrector 104 includes a subtracter 105, a PI controller (PI) 106, a polarity detector 107, and a multiplier (X) 108.

Figure 3:
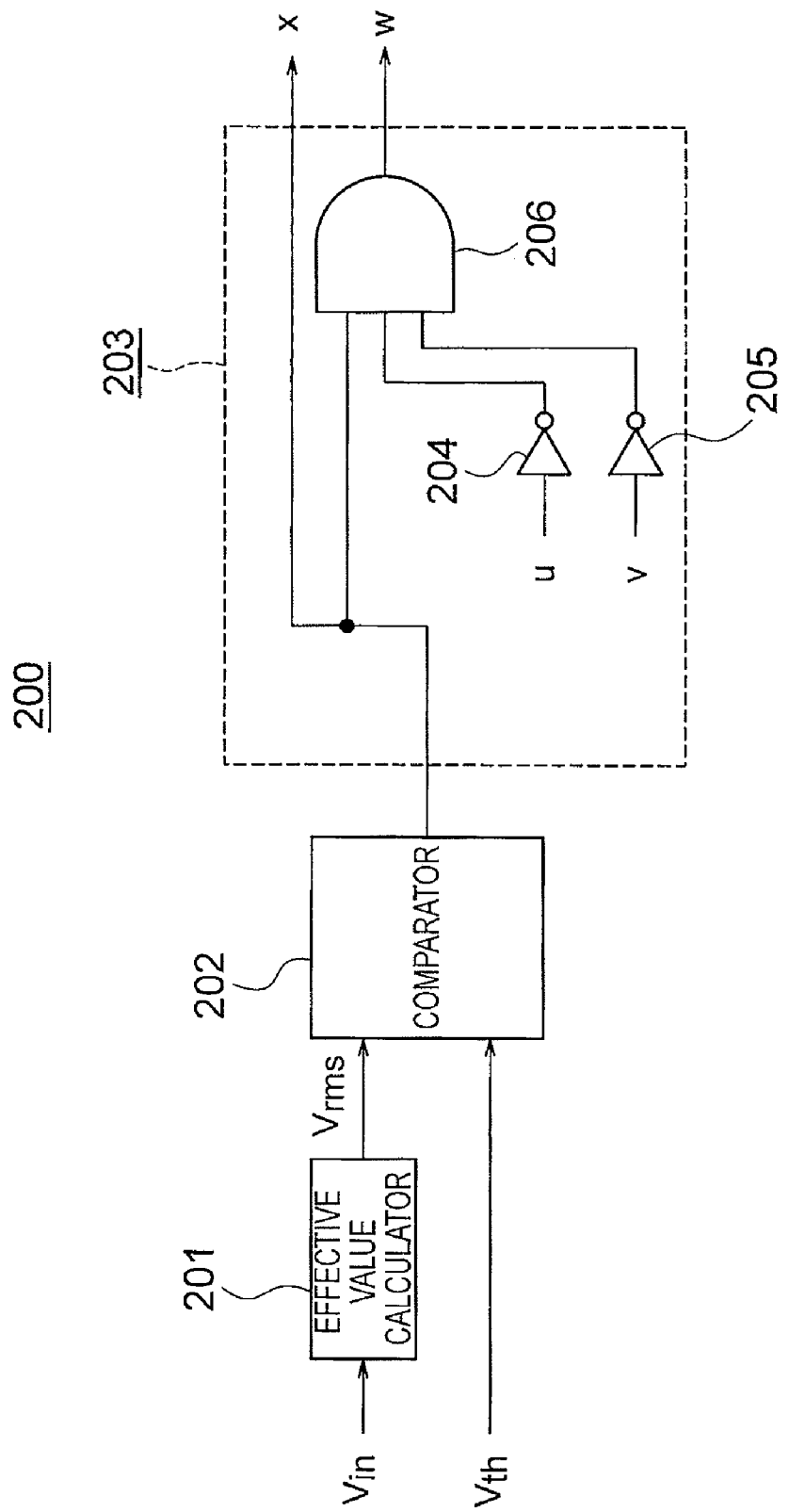
FIG. 3 illustrates a structure of a rectification mode control circuit of the power converter according to the first embodiment of the present invention.

FIG. 3 illustrates a structure of the rectification mode control circuit of the power converter according to the first embodiment of the present invention.

In FIG. 3, the rectification mode control circuit 200 includes an effective value calculator 201, a comparator 202, and a protection operator 203. The protection operator 203 includes NOT elements 204 and 205 and an AND element 206.

Figure 4:
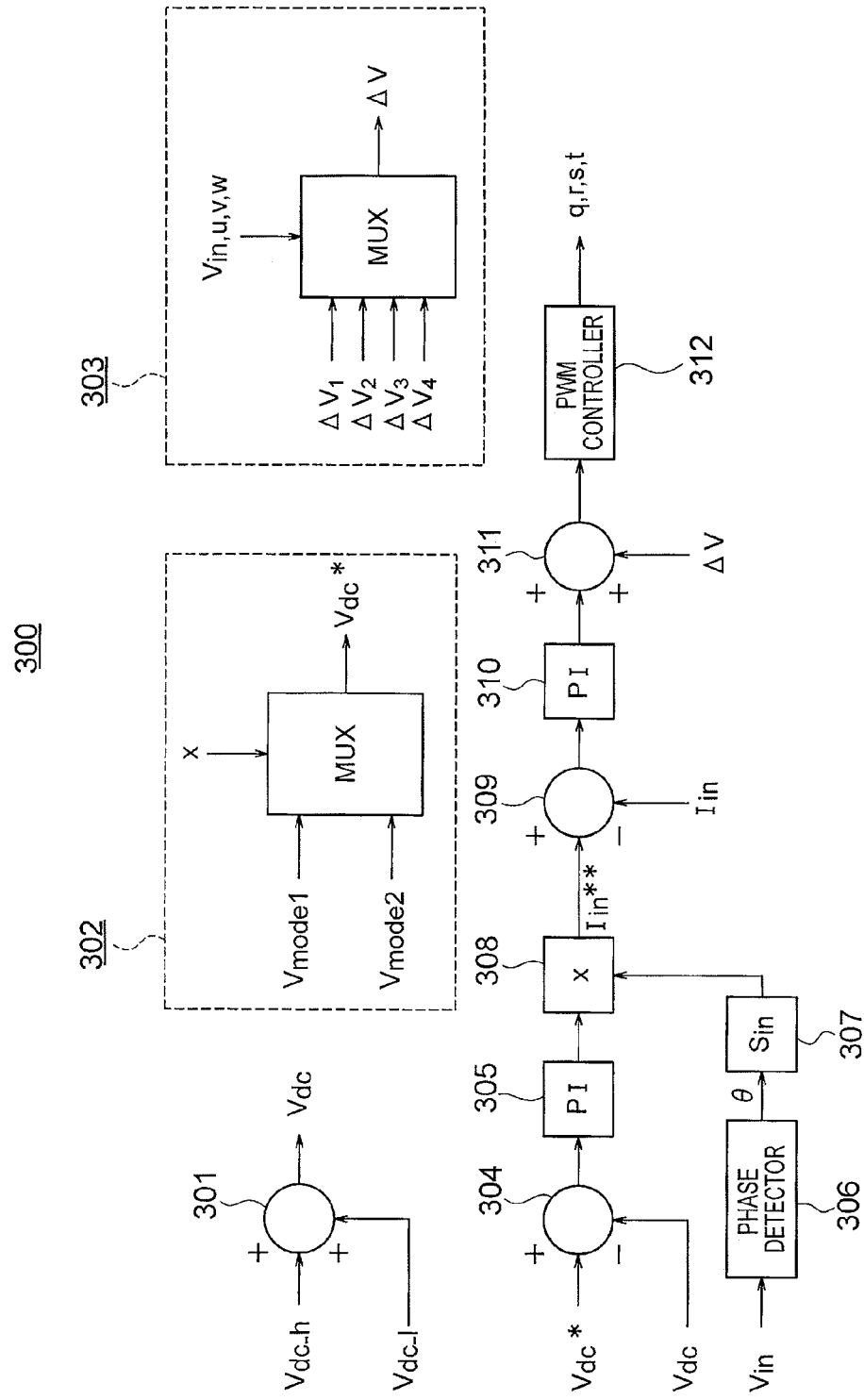
FIG. 4 illustrates a structure of an inverter control circuit of the power converter according to the first embodiment of the present invention.

FIG. 4 illustrates a structure of the inverter control circuit of the power converter according to the first embodiment of the present invention.

In FIG. 4, the inverter control circuit 300 includes an adder 301, a target output voltage selector 302, a correction voltage selector 303, a subtracter 304, a PI controller (PI) 305, a phase detector 306, a sine wave generator (Sin) 307, a multiplier (X) 308, a subtracter 309, a PI controller (PI) 310, an adder 311, and a PWM controller 312.

Reference symbols are defined as follows. In this specification, for convenience of the description herein, superscripts and subscripts on mathematical expressions and the drawings are not expressed as superscripts and subscripts.
Vin: AC input voltage which is detected by the voltage detection circuit 2 and transferred from a node "l".
Iin: AC input current which is detected by the current detection circuit 3 and transferred from a node "m".
Vsub: Voltage of the DC voltage source 10 included in the inverter circuit 5, which is detected by the voltage detection circuit 11 and transferred from a node "n".
Vsub*: Target voltage of the DC voltage source 10 included in the inverter circuit 5.
Vdc_h: DC voltage of the smoothing capacitor 22 which is detected by the voltage detection circuit 24 and transferred from a node "o".
Vdc_h*: Target DC voltage of the smoothing capacitor 22.
Vdc_l: DC voltage of the smoothing capacitor 23 which is detected by the voltage detection circuit 25 and transferred from a node "p".
Vdc_l*: Target DC voltage of the smoothing capacitor 23.
Vdc: Total DC voltage (output voltage) of the DC voltage Vdc_h of the smoothing capacitor 22 and the DC voltage Vdc_l of the smoothing capacitor 23.
Vdc*: Target DC voltage (target output voltage) of total DC voltage of the DC voltage Vdc_h of the smoothing capacitor 22 and the DC voltage Vdc_l of the smoothing capacitor 23.
θ: Input voltage phase from the AC power supply 1.

Next, an operation of the power converter according to the first embodiment is described with reference to the drawings.

The control of the short-circuit switch control circuit 100 illustrated in FIG. 2 is described. In order to maintain the voltage Vsub of the DC voltage source 10 constant, a difference 101v between the voltage Vsub input from the node "n" and the target voltage Vsub* is obtained by the subtracter 101, and a PI-controlled output is operated by the PI controller 102 based on the difference as a feedback amount to obtain a phase 102v for turning on the short-circuit switches 14 and 17. In order to balance the DC voltages Vdc_h and Vdc_l of the smoothing capacitors 22 and 23, a correction term 104v from the corrector 104 is added to the phase 102v by the adder 103.

In the corrector 104, a difference 105v between the DC voltages Vdc_h and Vdc_l input from the nodes "o" and "p" is obtained by the subtracter 105, and a PI-controlled output is operated by the PI controller 106 based on the difference as a feedback amount. Therefore, the DC voltages Vdc_h and Vdc_l are controlled at a ratio of 1:1, that is, the DC voltages Vdc_h and Vdc_l are controlled to Vdc*/2. A coefficient 107v is obtained by the polarity detector 107 based on the polarity of the input voltage Vin input from the node "l". An output of the PI controller 106 is multiplied by the coefficient 107v by the multiplier 108 to obtain the correction term 104v for the phase 102v for turning on the short-circuit switches 14 and 17. When Vin>0, the polarity detector 107 outputs "+1" as the coefficient 107v. When Vin<0, the polarity detector 107 outputs "−1" as the coefficient 107v. In the short-circuit switch control circuit 100, the phase 102v for turning on the short-circuit switches 14 and 17 and the correction term 104v are operated. A corrected phase 103v for turning on the short-circuit switches 14 and 17 is obtained by the adder 103. Short-circuit switch control signals "u" and "v" for the short-circuit switches 14 and 17 are obtained by the PWM controller 109. For convenience of the description, as in the case of the short-circuit switch control signals "u" and "v", there is a case where the reference symbols "u" and "v" indicate both the signals and the nodes for transferring the corresponding signals.

Figure 27:
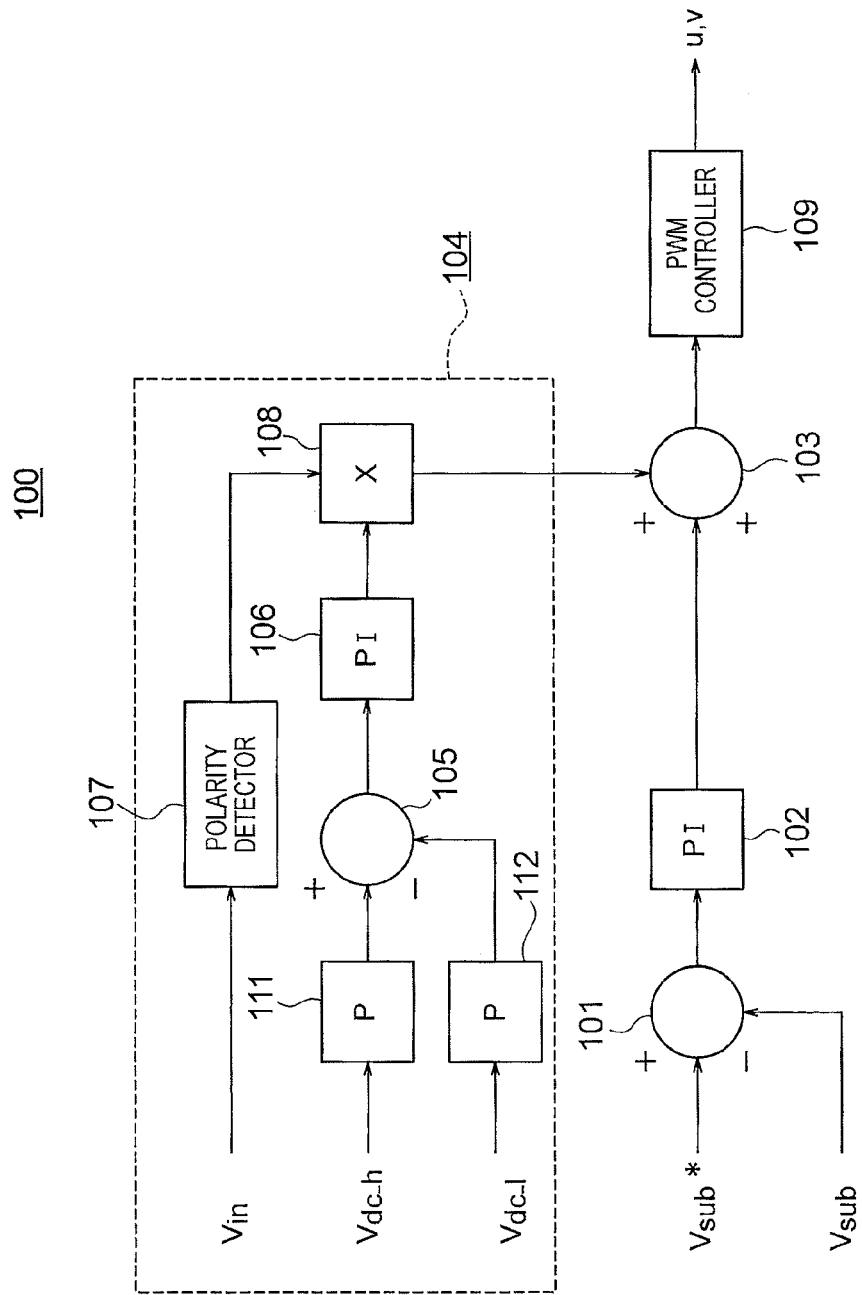
FIG. 27 illustrates another structure of the short-circuit switch control circuit of the power converter according to the first embodiment of the present invention.

FIG. 27 illustrates another structure of the short-circuit switch control circuit of the power converter according to the first embodiment of the present invention. Unlike the short-circuit switch control circuit 100 illustrated in FIG. 2, proportional controllers (P) 111 and 112 are further provided. As illustrated in FIG. 27, the DC voltages Vdc_h and Vdc_l are proportionally controlled and input to the subtracter 105 to obtain a difference between the DC voltages. Therefore, the output voltage Vdc may be controlled to the target output voltage Vdc* while the DC voltages Vdc_h and Vdc_l are controlled at a ratio other than 1:1.

Next, the control using the rectification mode control circuit 200 illustrated in FIG. 3 is described. An effective value Vrms is calculated by the effective value calculator 201 based on the input voltage Vin input from the node "l". The effective value Vrms is compared with a set voltage threshold Vth by the comparator 202 to obtain a rectification mode determination signal "x". In order to prevent the short-circuit switches 14 and 17 and the rectification mode changing circuit 19 from being simultaneously turned on, protection operation control is performed by the protection operator 203. When the short-circuit switches 14 and 17 are in an on state, the protection operator 203 obtains a rectifying switch control signal "w" which is an output of a multiplexer (MUX) based on the short-circuit switch control signals "u" and "v" as selection signals, to maintain the rectification mode changing circuit 19 in an off state.

The control of the inverter control circuit 300 illustrated in FIG. 4 is described. The DC voltages Vdc_h and Vdc_l of the smoothing capacitors 22 and 23 which are input from the nodes "o" and "p" are added to each other by the adder 301 to obtain the output voltage Vdc. The target output voltage selector 302 selects the target output voltage Vdc* from target output voltages Vmode1 and Vmode2 set for respective rectification modes in response to the rectification mode determination signal "x". The correction voltage selector 303 selects a feed forward correction voltage ΔV from feed forward correction voltages ΔV1, ΔV2, ΔV3, and ΔV4 in response to the input voltage Vin, the short-circuit switch control signals "u" and "v", and the rectifying switch control signal "w".

A difference 304v between the output voltage Vdc and the target output voltage Vdc* is obtained by the subtracter 304, and a PI-controlled output is operated by the PI controller 305 based on the difference as a feedback amount to determine a target amplitude 305v for the input current Iin. The phase detector 306 detects the input voltage phase θ based on the input voltage Vin input from the node "l". The sine wave generator 307 generates and outputs a sine wave 307v synchronized with the input voltage Vin. The multiplier 308 multiplies the target amplitude 305v by the sine wave 307v to generate a sine wave current command Iin** synchronized with the input voltage Vin.

A difference 309v between the current command Iin** and the input current Iin which is input from the node "m" and detected is obtained by the subtracter 309, and a PI-controlled output is set as a voltage instruction 310v which is a target voltage value generated in the inverter circuit 5, by the PI controller 310 based on the difference as a feedback amount. In this case, the voltage instruction 310v is corrected by being added by the adder 311 with the feed forward correction voltage ΔV synchronized with times when the short-circuit switches 14 and 17 are turned on and off. The PWM controller 312 generates inverter switch control signals "q", "r", "s", and "t" for the respective semiconductor switch elements 6, 7, 8, and 9 of the inverter circuit 5, based on a corrected voltage instruction 311v to operate the inverter circuit 5.

In the correction voltage selector 303 illustrated in FIG. 4, the feed forward correction voltage ΔV is controlled based on the polarity of the AC power supply 1, the on and off states of the short-circuit switches 14 and 17, and the on and off states of the rectification mode changing circuit 19. In a specific phase such as a zero-cross phase (θ=0 or θ=π) of the input voltage Vin from the AC power supply 1, the short-circuit switch control circuit 100 switches the on and off states of the short-circuit switches 14 and 17. When the short-circuit switches 14 and 17 are to be turned off from the on state by the short-circuit switch control circuit 100, the inverter circuit 5 is changed from the control for charging the DC voltage source 10 to the control for discharging the DC voltage source 10. When the short-circuit switches 14 and 17 are to be turned on from the off state by the short-circuit switch control circuit 100, the inverter circuit 5 is changed from the control for discharging the DC voltage source 10 to the control for charging the DC voltage source 10. When the voltage instruction 310v is corrected by being added with the feed forward correction voltage ΔV synchronized with the times when the short-circuit switches 14 and 17 are turned on and off as described above, the control may be prevented from being delayed by a response time period of the feedback control.

In the first embodiment, the inverter circuit 5 is controlled by the inverter control circuit 300 based on the current command Iin** as described above. When the rectification mode changing circuit 19 is in the off state, the output voltage Vdc follows the target output voltage Vdc*. When the rectification mode changing circuit 19 is in the on state, the DC voltage Vdc_h of the smoothing capacitor 22 and the DC voltage Vdc_l of the smoothing capacitor 23 follow Vdc*/2 which is ½ of the target output voltage. Therefore, the output voltage Vdc is controlled so as to improve an input power factor from the AC power supply 1.

The operation of the power converter having the structure as described above is described with reference to respective waveforms illustrated in FIG. 5.

Figure 5:
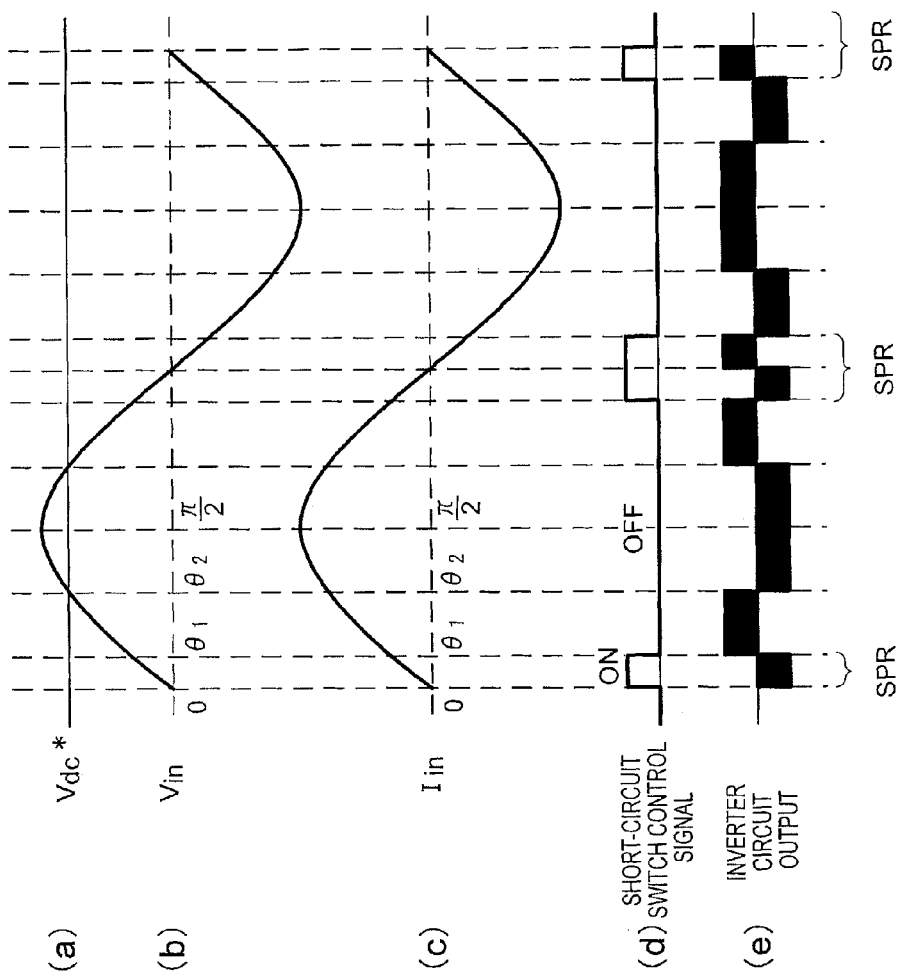
FIG. 5 is a timing chart illustrating waveforms of respective portions of the power converter according to the first embodiment of the present invention.

The input voltage Vin and the input current Iin from the AC power supply 1 have waveforms illustrated in (b) and (c) of FIG. 5. The short-circuit switch control circuit 100 controls the on and off states of the short-circuit switches 14 and 17 based on the short-circuit switch control signals "u" and "v" as illustrated in (d) of FIG. 5. The rectification mode control circuit 200 compares the input voltage Vin with the set voltage threshold Vth and controls the on and off states of the rectification mode changing circuit 19 based on the rectifying switch control signal "w". The inverter control circuit 300 PWM-controls the inverter circuit 5 based on the inverter switch control signals "q", "r", "s", and "t". The output voltage Vdc is controlled so that the output voltage Vdc follows the target output voltage Vdc* in the case where the rectification mode changing circuit 19 is in the off state, and the DC voltage Vdc_h of the smoothing capacitor 22 and the DC voltage Vdc_l of the smoothing capacitor 23 follow Vdc*/2 which is ½ of the target output voltage in the case where the rectification mode changing circuit 19 is in the on state. Therefore, the output voltage Vdc which is the total of the DC voltages of the smoothing capacitors 22 and 23 is controlled to a constant target output voltage Vdc* as illustrated in (a) of FIG. 5 without depending on the on and off states of the rectification mode changing circuit 19.

In the case where the short-circuit switches 14 and 17 are maintained in the off state by the short-circuit switch control circuit 100 and the rectification mode changing circuit 19 is maintained in the on state by the rectification mode control circuit 200, when the polarity of the AC power supply 1 is positive, a current circulates through a path including the AC power supply 1, the reactor 4, the inverter circuit 5, the rectifying diode 13, the smoothing capacitor 22, and the rectification mode changing circuit 19 in the stated order to return to the AC power supply 1. In this case, the DC voltage Vdc_h of the smoothing capacitor 22 is controlled to Vdc*/2 which is ½ of the constant target output voltage.

When the polarity of the AC power supply 1 is negative, a current circulates through a path including the AC power supply 1, the rectification mode changing circuit 19, the smoothing capacitor 23, the rectifying diode 15, the inverter circuit 5, and the reactor 4 in the stated order to return to the AC power supply 1. In this case, the DC voltage Vdc_l of the smoothing capacitor 23 is controlled to Vdc*/2 which is ½ of the constant target output voltage. In this case, it is assumed that a peak voltage of the input voltage Vin is higher than the DC voltages Vdc_h and Vdc_l of the smoothing capacitors 22 and 23.

The inverter control circuit 300 controls the on and off states of the semiconductor switch elements 6, 7, 8, and 9 of the inverter circuit 5 based on the inverter switch control signals "q", "r", "s", and "t" to PWM-control the AC input current Iin flowing through the semiconductor switch elements 6, 7, 8, and 9 so as to adjust the input power factor from the AC power supply 1 to substantially 1. The DC voltage source 10 of the inverter circuit 5 is charged and discharged based on the PWM-controlled current flowing through the DC voltage source 10. The inverter circuit 5 superimposes a generated voltage, which is a discharge voltage of the DC voltage source 10, on the AC input voltage Vin. The generated voltage is an output of the inverter circuit 5 as illustrated in (e) of FIG. 5. Note that shaded rectangular waves corresponding to the output of the inverter circuit 5 exhibit a large number of PWM pulses having a very small width.

Figure 6:
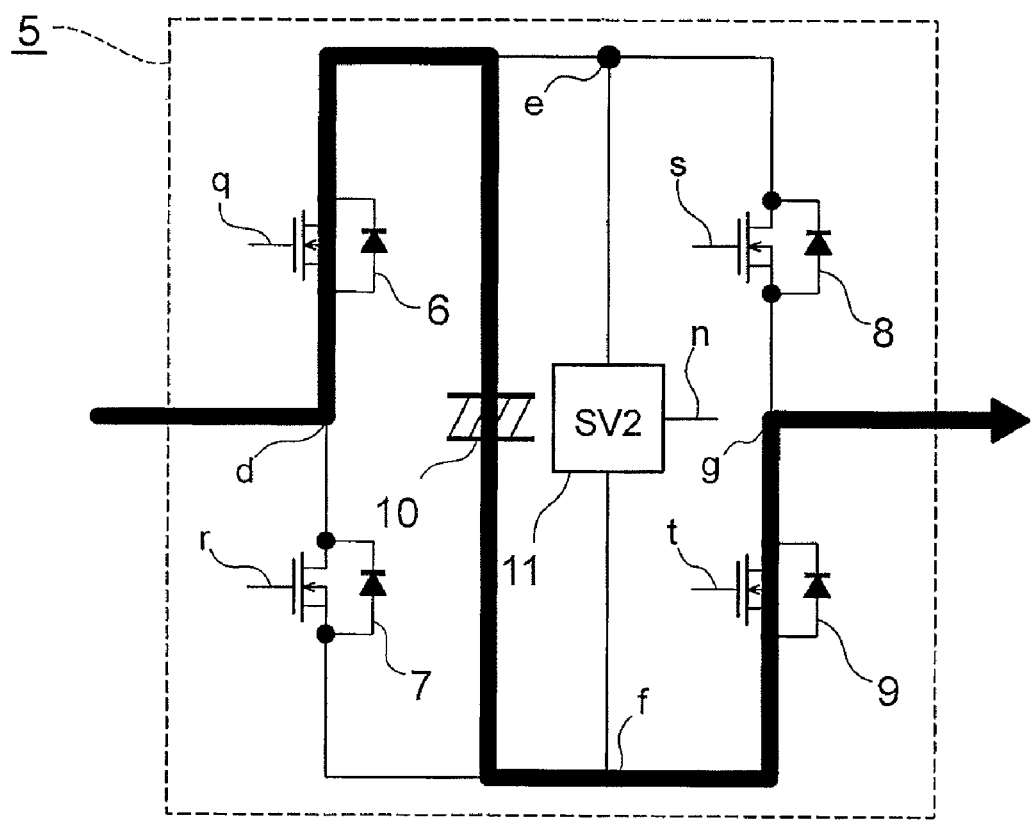
FIG. 6 illustrates an operation of an inverter circuit of the power converter according to the first embodiment of the present invention.

When the polarity of the AC power supply 1 is positive, the current of the inverter circuit 5 flows through one of four paths illustrated in FIGS. 6 to 9. When the semiconductor switch elements 7 and 8 are turned off by the inverter control circuit 300, as illustrated in FIG. 6, the current passes through the semiconductor switch element 6 to charge the DC voltage source 10 and then is output through the semiconductor switch element 9.

Figure 7:
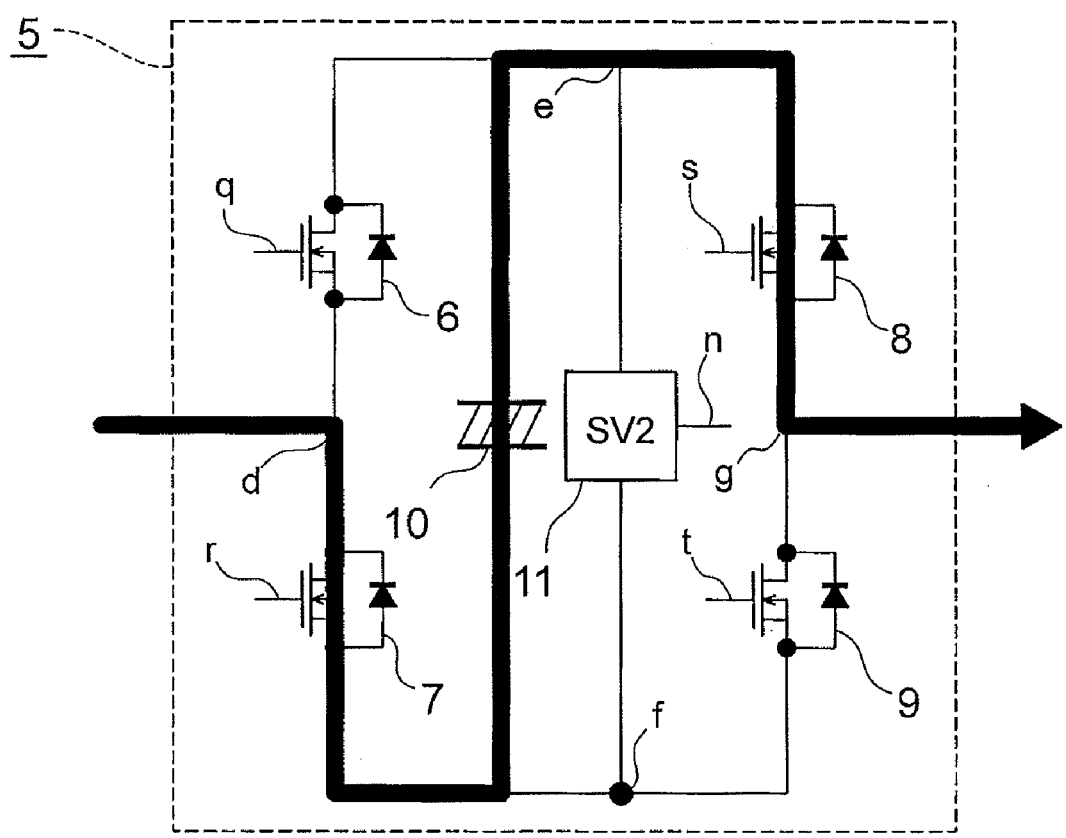
FIG. 7 illustrates another operation of the inverter circuit of the power converter according to the first embodiment of the present invention.

Further, when the semiconductor switch elements 7 and 8 are simultaneously turned on by the inverter control circuit 300, as illustrated in FIG. 7, the current passes through the semiconductor switch element 7 to discharge the DC voltage source 10 and then is output through the semiconductor switch element 8.

Figure 8:
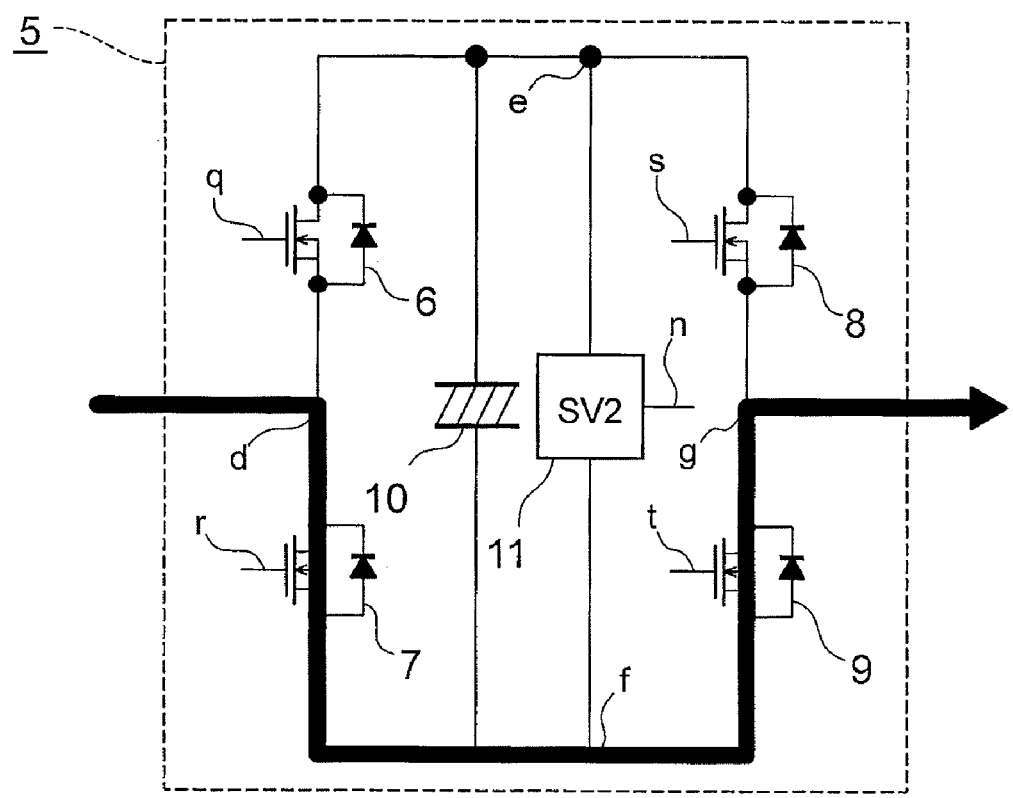
FIG. 8 illustrates still another operation of the inverter circuit of the power converter according to the first embodiment of the present invention.

Further, when only the semiconductor switch element 7 is turned on by the inverter control circuit 300, as illustrated in FIG. 8, the current is output through the semiconductor switch elements 7 and 9.

Figure 9:
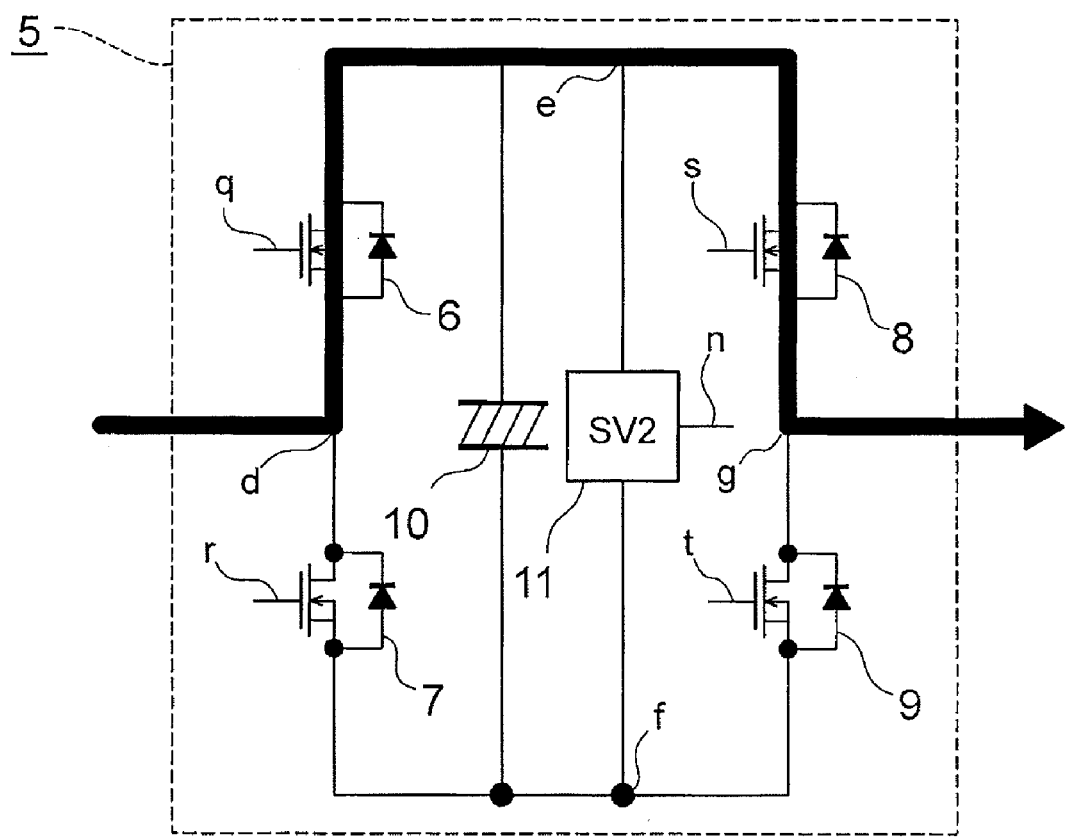
FIG. 9 illustrates a further operation of the inverter circuit of the power converter according to the first embodiment of the present invention.

Further, when only the semiconductor switch element 8 is turned on by the inverter control circuit 300, as illustrated in FIG. 9, the current is output through the semiconductor switch elements 6 and 8.

The inverter control circuit 300 controls the semiconductor switch elements 7 and 8 based on the four control combinations as described above to PWM-control the inverter circuit 5. In this case, the semiconductor switch elements 6 and 9 may be continuously maintained in the off state or may be operated in opposite phase to the semiconductor switch elements 7 and 8.

As illustrated in (a) and (b) of FIG. 5, the input voltage phase θ in a case where the input voltage Vin is equal to the target output voltage Vdc* is expressed as θ2 (0<θ2<π/2). As illustrated in (d) of FIG. 5, the short-circuit switches 14 and 17 are maintained in the on state by the short-circuit switch control circuit 100 while the input voltage phase θ is shifted from 0 to a predetermined phase θ1 (0<θ1<θ2).

Figure 10:
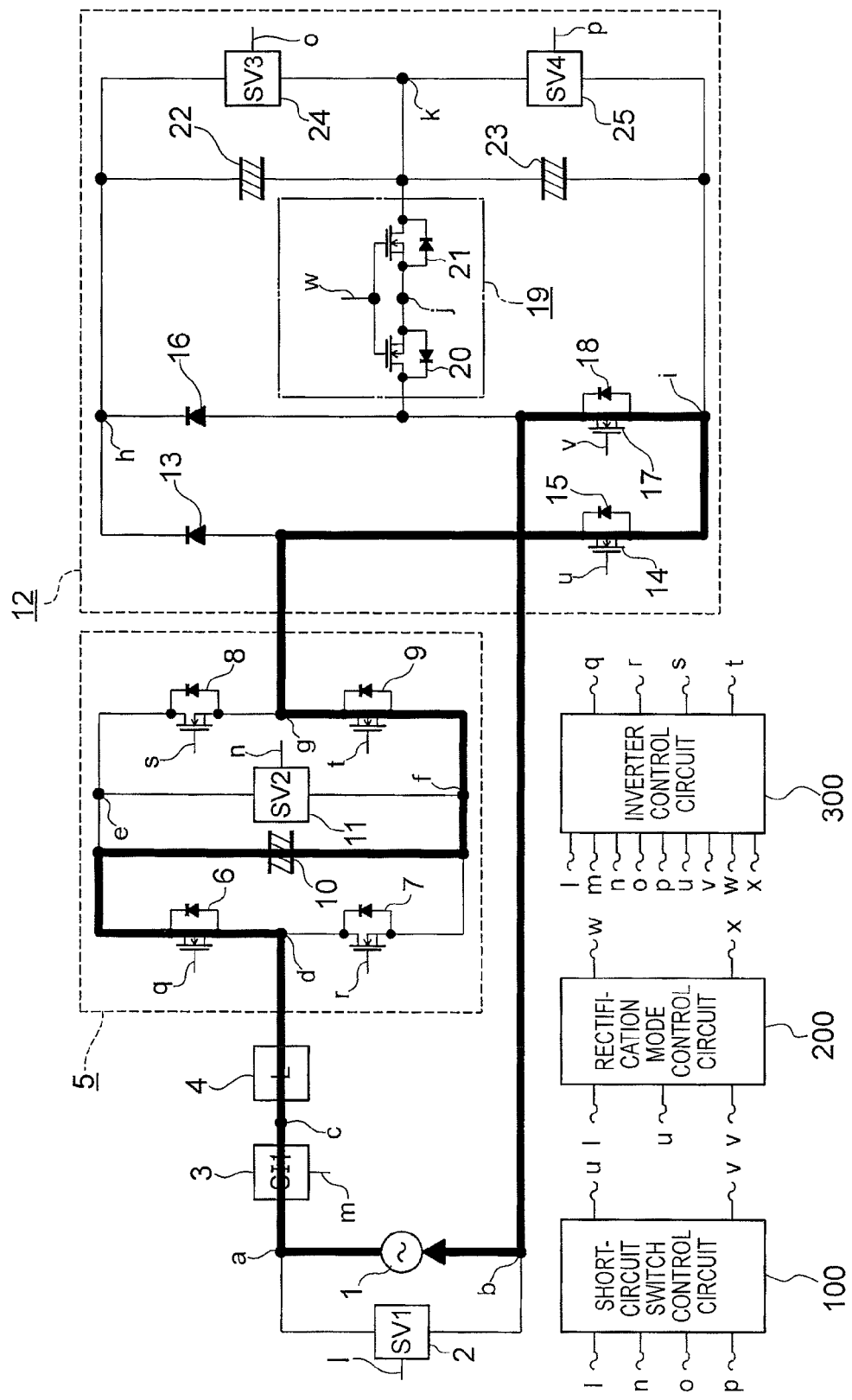
FIG. 10 illustrates an operation of the power converter according to the first embodiment of the present invention.

When the input voltage phase θ satisfies 0≦θ≦θ1 and the polarity of the AC power supply 1 is positive, as illustrated in FIG. 10, the current from the AC power supply 1 circulates through a path including the reactor 4, the inverter circuit 5, the short-circuit switch 14, and the short-circuit switch 17 in the stated order to return to the AC power supply 1.

Figure 11:
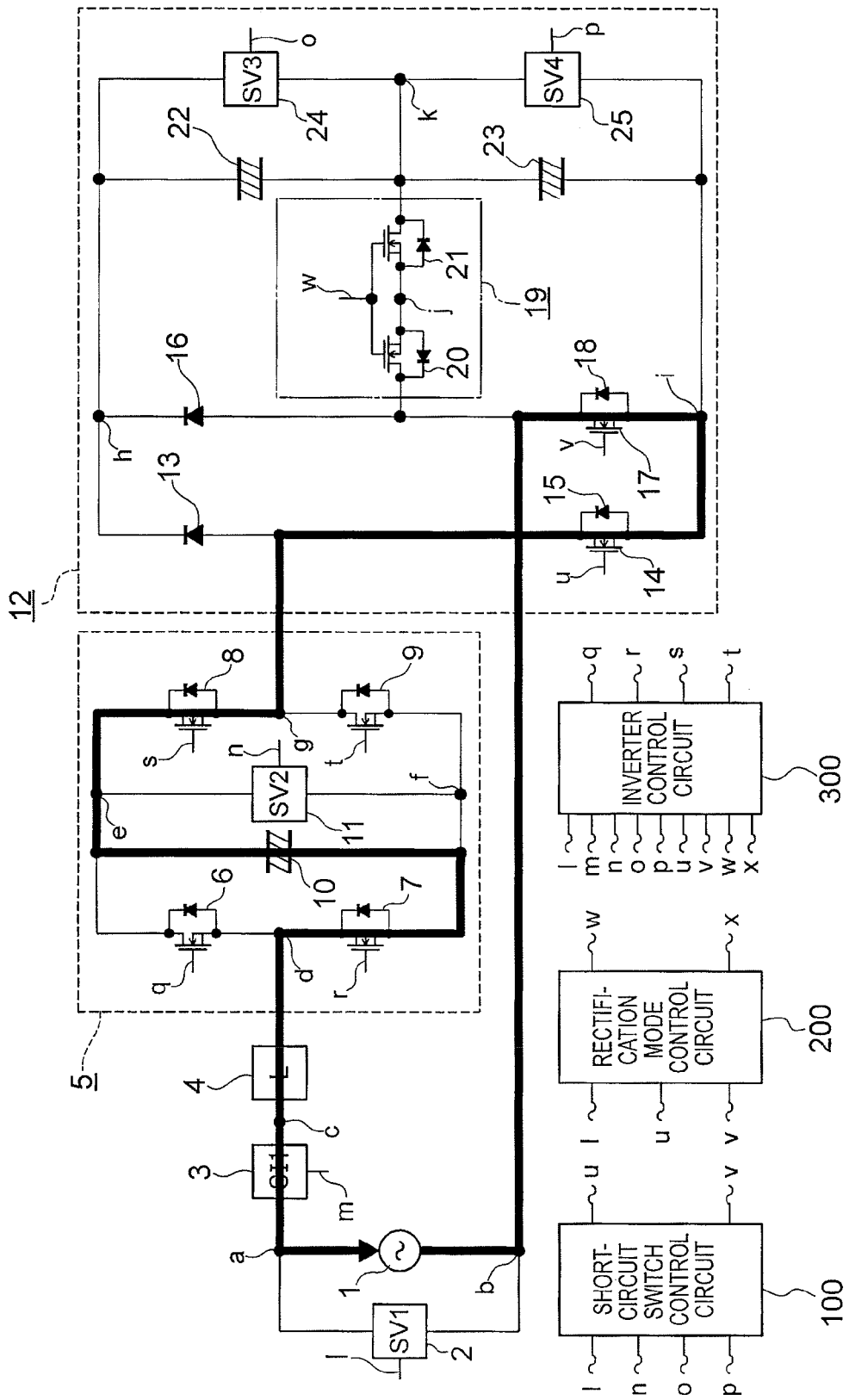
FIG. 11 illustrates another operation of the power converter according to the first embodiment of the present invention.

When the polarity of the AC power supply 1 is negative and the input voltage phase θ satisfies, for example, π≦θ≦(π+θ1), as illustrated in FIG. 11, the current from the AC power supply 1 circulates through a path opposite to the path illustrated in FIG. 10, that is, a path including the short-circuit switch 17, the short-circuit switch 14, the inverter circuit 5, and the reactor 4 in the stated order to return to the AC power supply 1.

In this case, the short-circuit switches 14 and 17 are maintained in the on state by the short-circuit switch control circuit 100, and hence currents do not flow into the rectifying diodes 13 and 16 and the smoothing capacitors 22 and 23 located in the output stage.

In the inverter circuit 5, for example, the case where the semiconductor switch elements 7 and 8 are in the off state and the case where only the semiconductor switch element 7 is in the on state are combined. Therefore, the input current Iin is controlled so as to adjust the input power factor to substantially 1 while a voltage substantially opposite in polarity to the input voltage Vin is generated. During this period, energy is charged in the DC voltage source 10.

When the short-circuit switch 17 is to be turned on by the short-circuit switch control circuit 100, the rectification mode changing circuit 19 is turned off by the rectification mode control circuit 200 so as to prevent the smoothing capacitor 23 from being short-circuited. That is, when the rectification mode changing circuit 19 is to be turned off in response to the rectifying switch control signal "w" from the rectification mode control circuit 200, the rectification mode changing circuit 19 is off-operated in opposite phase to the short-circuit switch 17.

Figure 12:
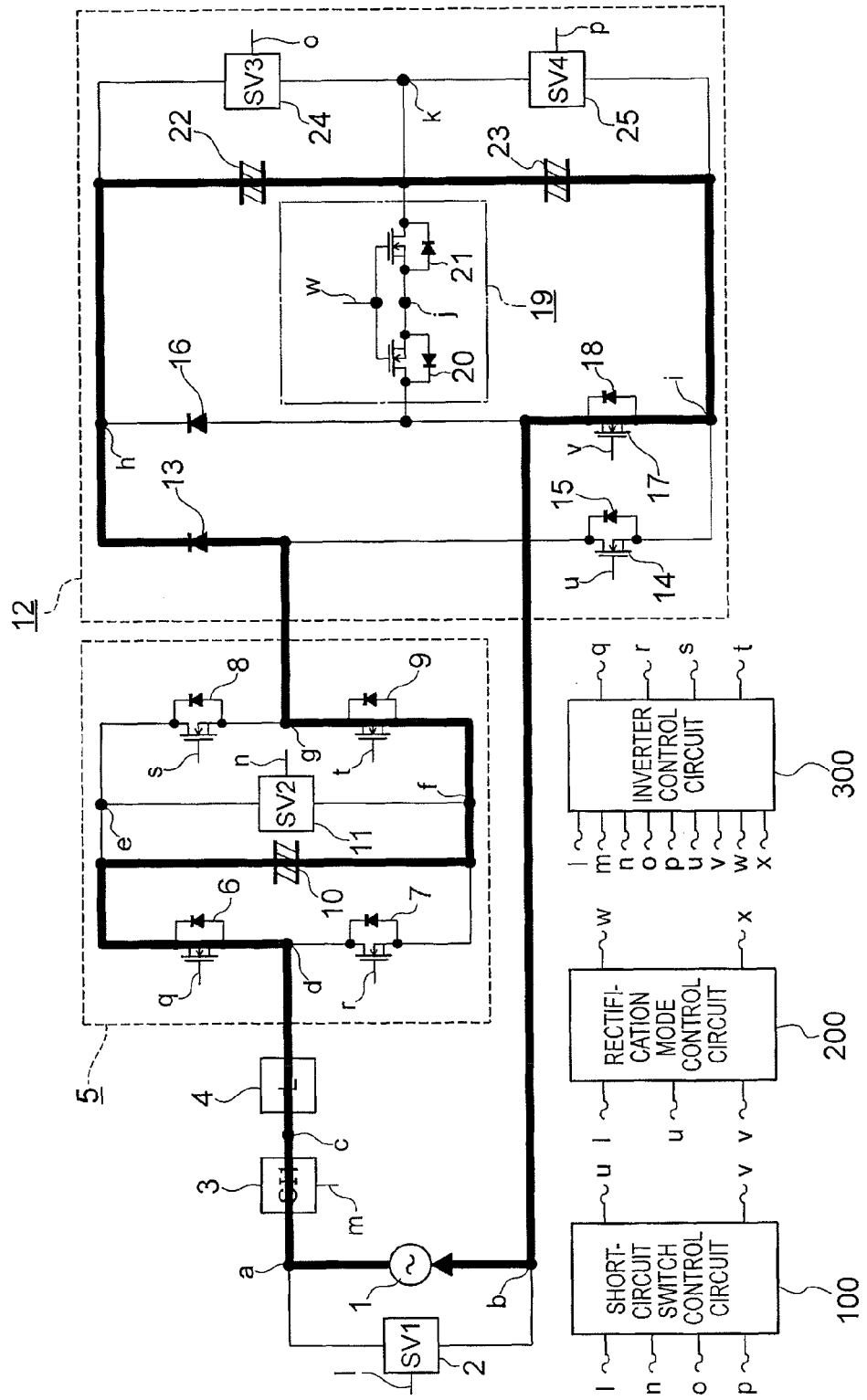
FIG. 12 illustrates still another operation of the power converter according to the first embodiment of the present invention.

The short-circuit switches 14 and 17 are turned off by the short-circuit switch control circuit 100 at a time when the phase θ is θ1. A current flows as follows while the phase θ satisfies θ1≦θ≦θ2. In the case where the rectification mode changing circuit 19 is maintained in the off state by the rectification mode control circuit 200 and the polarity of the AC power supply 1 is positive, for example, when the semiconductor switch elements 7 and 8 are simultaneously turned off by the inverter control circuit 300, as illustrated in FIG. 12, the current circulates through a path including the AC power supply 1, the reactor 4, the inverter circuit 5, the rectifying diode 13, the smoothing capacitor 22, the smoothing capacitor 23, and the rectifying diode 18 in the stated order to return to the AC power supply 1.

In this case, the input current Iin is controlled by the inverter circuit 5 so as to adjust the input power factor to substantially 1 while a voltage substantially equal to "Vdc*-Vin" is generated to be able to maintain the output voltage Vdc to the target output voltage Vdc*. An absolute value of the input voltage Vin is equal to or smaller than the target output voltage Vdc*, and hence the DC voltage source 10 is averagely discharged. FIG. 12 illustrates an instant of the PWM control process of the inverter circuit 5. A flow of the current in the case where the DC voltage source 10 is charged is illustrated, but the DC voltage source 10 is discharged in view of time averaging.

Figure 13:
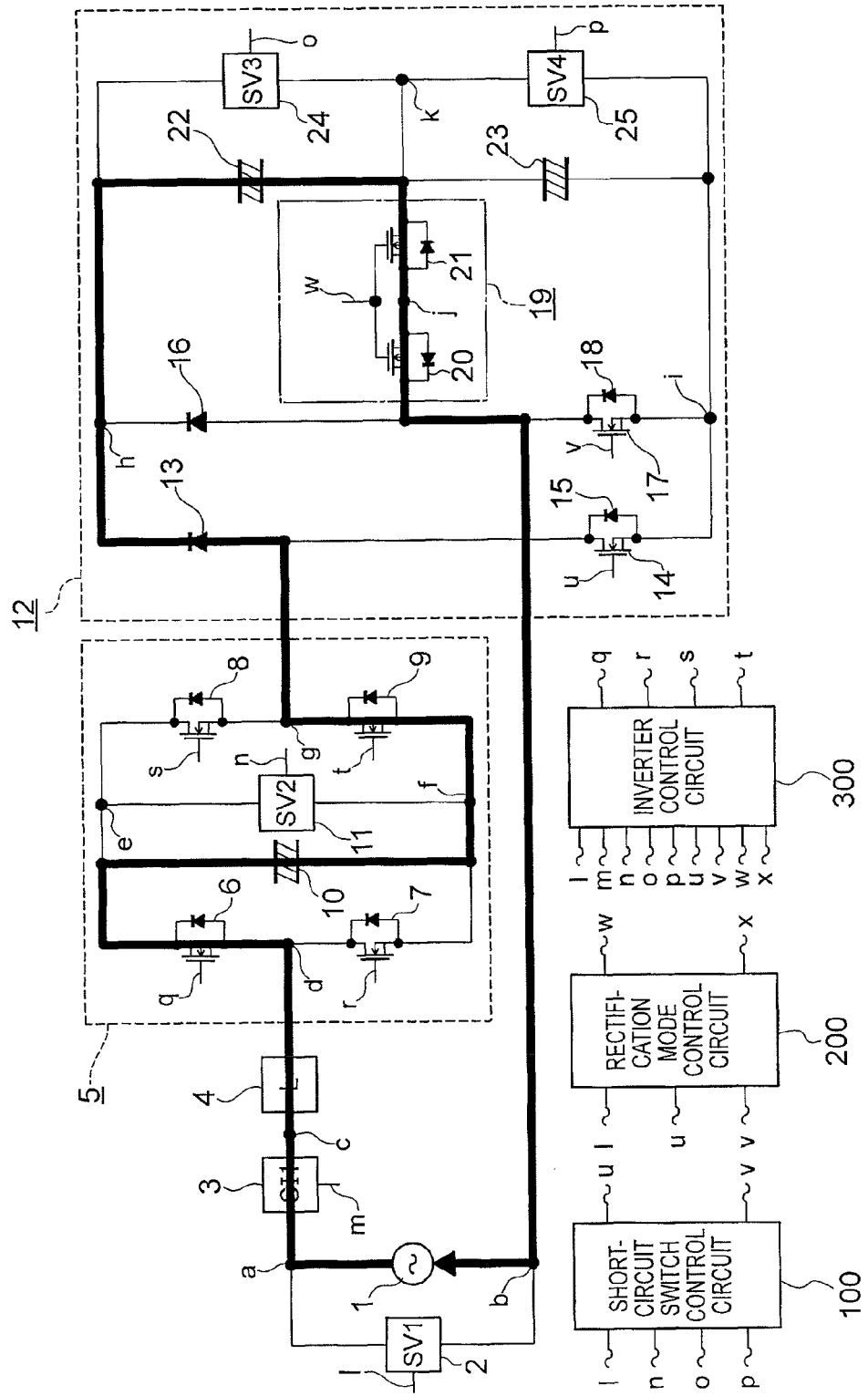
FIG. 13 illustrates a further operation of the power converter according to the first embodiment of the present invention.

In the case where the rectification mode changing circuit 19 is maintained in the on state by the rectification mode control circuit 200 and the polarity of the AC power supply 1 is positive, for example, when the semiconductor switch elements 7 and 8 are simultaneously turned off by the inverter circuit 300, as illustrated in FIG. 13, the current circulates through a path including the AC power supply 1, the reactor 4, the inverter circuit 5, the rectifying diode 13, the smoothing capacitor 22, and the rectification mode changing circuit 19 in the stated order to return to the AC power supply 1.

In this case, the input current Iin is controlled by the inverter circuit 5 so as to adjust the input power factor to substantially 1 while a voltage substantially equal to "Vdc*/2-Vin" is generated to be able to maintain the DC voltage Vdc_h of the smoothing capacitor 22 to Vdc*/2 which is ½ of the target output voltage. An absolute value of the input voltage Vin is equal to or smaller than Vdc*/2 which is ½ of the target output voltage and corresponds to the DC voltage of the smoothing capacitor 22, and hence the DC voltage source 10 is averagely discharged. FIG. 13 illustrates an instant of the PWM control process of the inverter circuit 5. A flow of the current in the case where the DC voltage source 10 is charged is illustrated, but the DC voltage source 10 is discharged in view of time averaging.

At a time when the phase θ is θ2, when the input voltage Vin is equal to the target output voltage Vdc* in the case where the rectification mode changing circuit 19 is maintained in the off state by the rectification mode control circuit 200 or when the input voltage Vin is equal to Vdc*/2 which is ½ of the target output voltage and corresponds to the DC voltage of one of the smoothing capacitors 22 and 23 in the case where the rectification mode changing circuit 19 is maintained in the on state by the rectification mode control circuit 200, as illustrated in (d) of FIG. 5, the short-circuit switches 14 and 17 continue the off state, but the operation of the inverter circuit 5 is changed.

That is, when the phase θ satisfies θ2≦θ≦π/2, a current flows as follows. In the case where the rectification mode changing circuit 19 is maintained in the off state by the rectification mode control circuit 200 and the polarity of the AC power supply 1 is positive, the current circulates through a path including the AC power supply 1, the reactor 4, the inverter circuit 5, the rectifying diode 13, the smoothing capacitor 22, the smoothing capacitor 23, and the rectifying diode 18 in the stated order to return to the AC power supply 1.

In this case, the target output voltage Vdc* is equal to or smaller than the input voltage Vin (Vdc*Vin). Therefore, the input current Iin is controlled by the inverter circuit 5 so as to adjust the input power factor to substantially 1 while a voltage which is substantially equal to "Vin−Vdc*" and opposite in polarity to the input voltage Vin is generated to be able to maintain the output voltage Vdc to the target output voltage Vdc*. During this period, the voltage generated in the inverter circuit 5 is opposite in polarity to the input current Iin, and hence the DC voltage source 10 is averagely charged.

In the case where the rectification mode changing circuit 19 is maintained in the on state by the rectification mode control circuit 200 and the polarity of the AC power supply 1 is positive, the current circulates through a path including the AC power supply 1, the reactor 4, the inverter circuit 5, the rectifying diode 13, the smoothing capacitor 22, and the rectification mode changing circuit 19 in the stated order to return to the AC power supply 1.

In this case, Vdc*/2 which is ½ of the target output voltage and corresponds to the DC voltage of the smoothing capacitor 22 is equal to or smaller than the input voltage Vin (Vdc*/2≦Vin). Therefore, the input current Iin is controlled by the inverter circuit 5 so as to adjust the input power factor to substantially 1 while a voltage which is substantially equal to "Vin−Vdc*/2" and opposite in polarity to the input voltage Vin is generated to be able to maintain the DC voltage Vdc_h of the smoothing capacitor 22 and the DC voltage Vdc_l of the smoothing capacitor 23 to Vdc*/2 which is ½ of the target output voltage. During this period, the voltage generated in the inverter circuit 5 is opposite in polarity to the input current Iin, and hence the DC voltage source 10 is averagely charged.

The operation of the power converter according to the first embodiment during a phase period of $\pi/2 \leq \theta \leq \pi$ is symmetrical to the operation during the phase period of $0 \leq \theta \leq \pi/2$ as described above. The operation during a phase period of $\pi \leq \theta \leq 2\pi$ is symmetrical to the operation during the phase period of $0 \leq \theta \leq \pi$.

Specifically, the zero-cross phase ($\theta=0$ or $\theta=\pi$) of the phase $\theta$ of the input voltage from the AC power supply 1 is set as the specific phase to switch the short-circuit switches 14 and 17 by the short-circuit switch control circuit 100. Only in a phase range of $\pm\theta 1$ (hereinafter, referred to as short-circuit phase range SPR) relative to the zero-cross phase, the short-circuit switches 14 and 17 are maintained in the on state to bypass the smoothing capacitors 22 and 23. In this case, the input current Iin is controlled by the inverter circuit 5 so as to adjust the input power factor to substantially 1 while a voltage substantially opposite in polarity to the input voltage Vin is generated. In this manner, the DC voltage source 10 is averagely charged or discharged.

In a phase range other than the short-circuit phase range SPR, when the rectification mode changing circuit 19 is maintained in the off state by the rectification mode control circuit 200, the input current Iin is controlled by the inverter circuit 5 so as to maintain the output voltage Vdc to the target output voltage Vdc*, to thereby adjust the input power factor to substantially 1. When the input voltage Vin is equal to or smaller than the target output voltage Vdc*, the DC voltage source 10 is averagely discharged. When the input voltage Vin is larger than the target output voltage Vdc*, the DC voltage source 10 is averagely charged.

In addition, when the rectification mode changing circuit 19 is maintained in the on state by the rectification mode control circuit 200, the input current Iin is controlled by the inverter circuit 5 so as to maintain the DC voltage Vdc_h of the smoothing capacitor 22 and the DC voltage Vdc_l of the smoothing capacitor 23 to Vdc*/2 which is ½ of the target output voltage, to thereby adjust the input power factor to substantially 1. When the input voltage Vin is equal to or smaller than Vdc*/2 which is ½ of the target output voltage and corresponds to one of the DC voltage Vdc_h of the smoothing capacitor 22 and the DC voltage Vdc_l of the smoothing capacitor 23, the DC voltage source 10 is averagely discharged. When the input voltage Vin is larger than Vdc*/2 which is ½ of the target output voltage, the DC voltage source 10 is averagely charged.

When the predetermined phase $\theta 1$ is set to a large value, energy charged in the DC voltage source 10 increases. Therefore, at the time of subsequent discharging, a generated voltage may be superimposed on the input voltage Vin which is in a high-voltage range and large energy may be discharged. Thus, the DC voltage Vdc_h of the smoothing capacitor 22, the DC voltage Vdc_l of the smoothing capacitor 23, and the output voltage Vdc (target output voltage Vdc*) may be increased.

In the phase period of $0 \leq \theta \leq \pi/2$, as described above, the DC voltage source 10 is charged during the periods of $0 \leq \theta \leq \theta 1$ and $\theta 2 \leq \theta \leq \pi/2$ and discharged during the period of $\theta 1 \leq \theta \leq \theta 2$. When the charge and discharge energies of the DC voltage source 10 are equal to each other, the following expression is held. Note that Vp indicates a peak voltage of the input voltage Vin and Ip indicates a peak current of the input current Iin.

$$\int_0^{\theta_1} V_p \sin\theta \cdot I_p \sin\theta \cdot d\theta + \int_{\theta_2}^{\pi/2}(V_p \sin\theta - V_{dc}^*) \cdot I_p \sin\theta \cdot d\theta = \int_{\theta_1}^{\theta_2}(V_{dc}^* - V_p \sin\theta) \cdot I_p \sin\theta \cdot d\theta \qquad \text{[Equation 1]}$$

When Vin=Vp·sin θ and Iin=Ip·sin θ, Vdc*=Vp·π/(4 cos θ1). Therefore, the target output voltage Vdc* is determined based on the predetermined phase θ1 for determining the short-circuit phase range SPR, that is, the target output voltage Vdc* may be controlled by adjusting the predetermined phase θ1. The output voltage Vdc is controlled to follow the target output voltage Vdc*.

When the voltage Vsub of the DC voltage source 10 is set to a value equal to or larger than a desired generated voltage of the inverter circuit 5 in each of the phase ranges of $0 \leq \theta \leq \theta 1$, $\theta 1 \leq \theta \leq \theta 2$, and $\theta 2 \leq \theta \leq \pi/2$, the desired control as described above may be performed on the inverter circuit 5 with high reliability. That is, when the voltage Vsub is set to satisfy three conditions of Vp·sin θ1≦Vsub, (Vdc*−Vp·sin θ1)≦Vsub, and (Vp−Vdc*)≦Vsub, the input current Iin is controlled by the inverter circuit 5 so as to maintain the output voltage Vdc to the target output voltage Vdc*, to thereby adjust the input power factor to substantially 1. Therefore, the control of the inverter circuit 5 may be performed with high reliability over all phases of the AC power supply 1. Note that the voltage Vsub of the DC voltage source 10 is set to a value equal to or smaller than the peak voltage Vp of the input voltage Vin.

In the first embodiment, as described above, the inverter control circuit 300 controls the inverter circuit 5 based on the current command Iin** as described above. When the rectification mode changing circuit 19 is in the off state, the output voltage Vdc follows the target output voltage Vdc*. When the rectification mode changing circuit 19 is in the on state, the DC voltage Vdc_h of the smoothing capacitor 22 and the DC voltage Vdc_l of the smoothing capacitor 23 follow Vdc*/2 which is ½ of the target output voltage. Therefore, the output voltage Vdc is controlled so as to improve the input power factor from the AC power supply 1.

The short-circuit switches 14 and 17 do not require high-frequency switching, and hence a voltage for switching, of the inverter circuit 5 which improves the input power factor to control the DC voltage Vdc for the output stage may be set to a value significantly lower than the peak voltage of the AC power supply 1. Therefore, switching loss and noise may be reduced without requiring a large reactor. When the short-circuit switches 14 and 17 are in the on state, the smoothing capacitors 22 and 23 may be bypassed to charge the DC voltage source 10, and hence the input current Iin is allowed to flow into the AC power supply 1 without generating a high voltage in the inverter circuit 5 and the charged energy may be used for discharging to the smoothing capacitors 22 and 23. Thus, the voltage for switching may be further reduced to promote improvement of efficiency and a reduction in noise.

The on and off states of the rectification mode changing circuit 19 are controlled by the rectification mode control circuit 200 to change the target voltage of the DC voltage source 10, select a charged capacitor of the smoothing capacitors 22 and 23, and balance the DC voltages of the smoothing capacitors 22 and 23. Therefore, each of the voltages of the smoothing capacitors 22 and 23 may be controlled to Vdc*/2 to obtain the target output voltage Vdc* as the output voltage Vdc. Thus, the inverter circuit 5 does not generate a high voltage, and hence the voltage for switching may be further reduced to further promote reductions in power loss and noise and a reduction in device structure size. In this case, the reactor 4 operates as not an energy reservoir but a current limit circuit for limiting a current, and hence current limit reliability is improved.

When the voltage Vsub of the DC voltage source 10 is set to a value equal to or smaller than the peak voltage Vp of the input voltage Vin, a high-efficiency effect and a low-noise effect are obtained with reliability.

Figure 14:
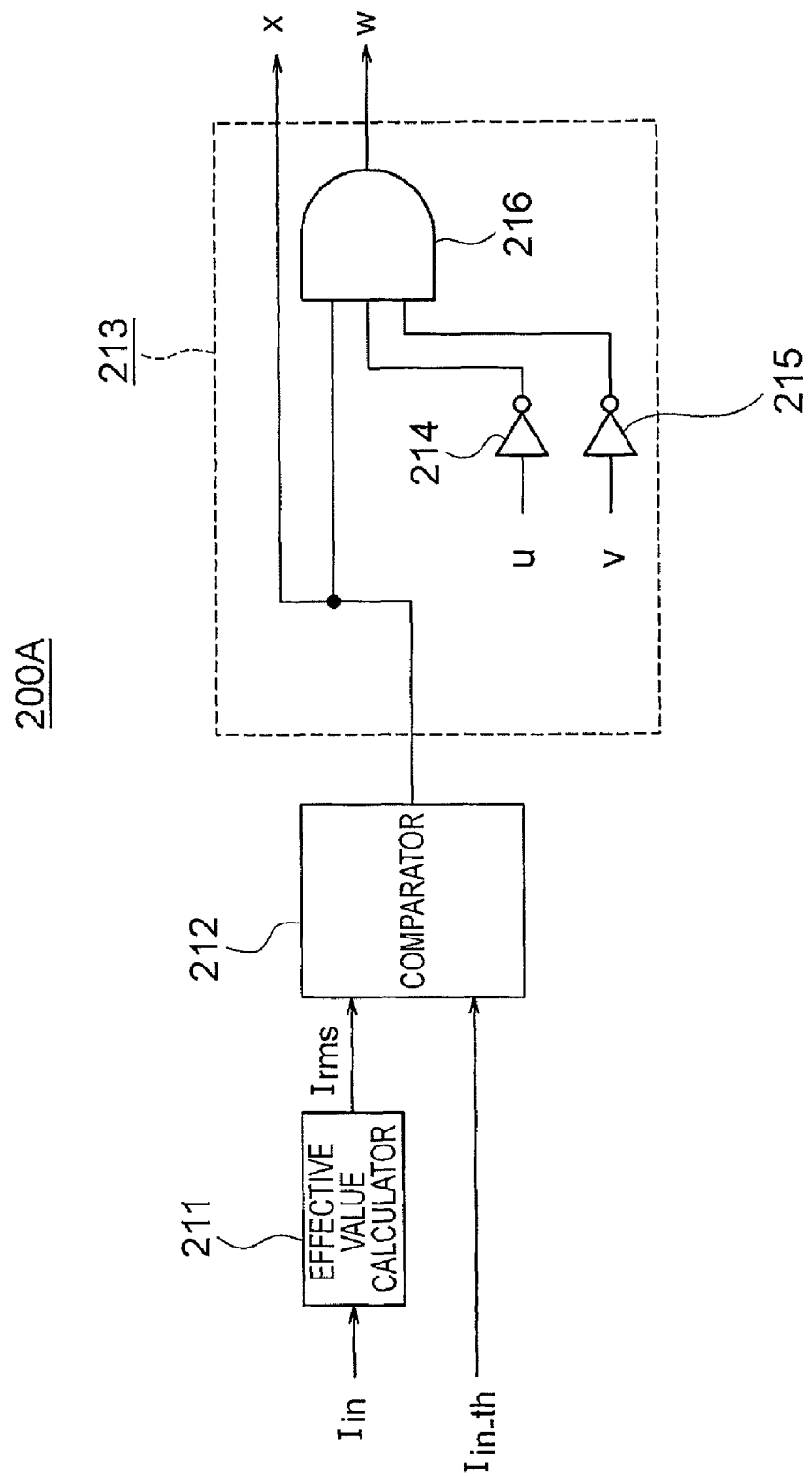
FIG. 14 illustrates another structure of the rectification mode control circuit of the power converter according to the first embodiment of the present invention.

In the first embodiment, as illustrated in FIG. 3, the rectification mode control circuit 200 generates the rectification mode determination signal "x" and the rectifying switch control signal "w" based on the input voltage Vin, the voltage threshold Vth, and the short-circuit switch control signals "u" and "v". As illustrated in FIG. 14, even when the input current Iin and a current threshold Iin_th are used instead of the input voltage Vin and the voltage threshold Vth which are illustrated in FIG. 3, the rectification mode determination signal "x" and the rectifying switch control signal "w" may be generated, and hence the same effect is obtained.

Figure 15:
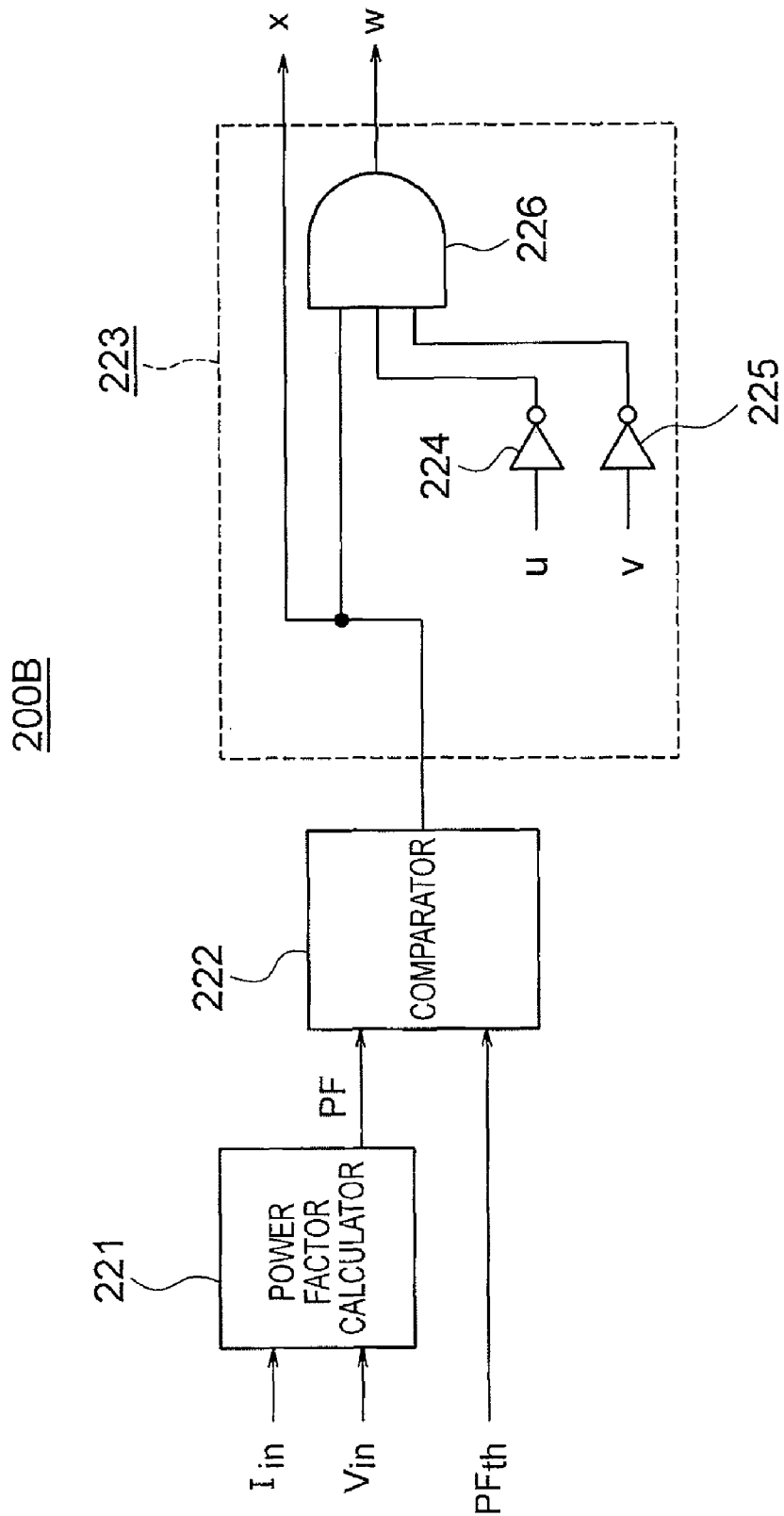
FIG. 15 illustrates still another structure of the rectification mode control circuit of the power converter according to the first embodiment of the present invention.

As illustrated in FIG. 15, even when a power factor PF calculated based on the input current Iin and the input voltage Vin by a power factor calculator 221 and a power factor threshold PFth are used instead of the input voltage Vin and the voltage threshold Vth which are illustrated in FIG. 3, the rectification mode determination signal "x" and the rectifying switch control signal "w" may be generated, and hence the same effect is obtained.

Figure 16:
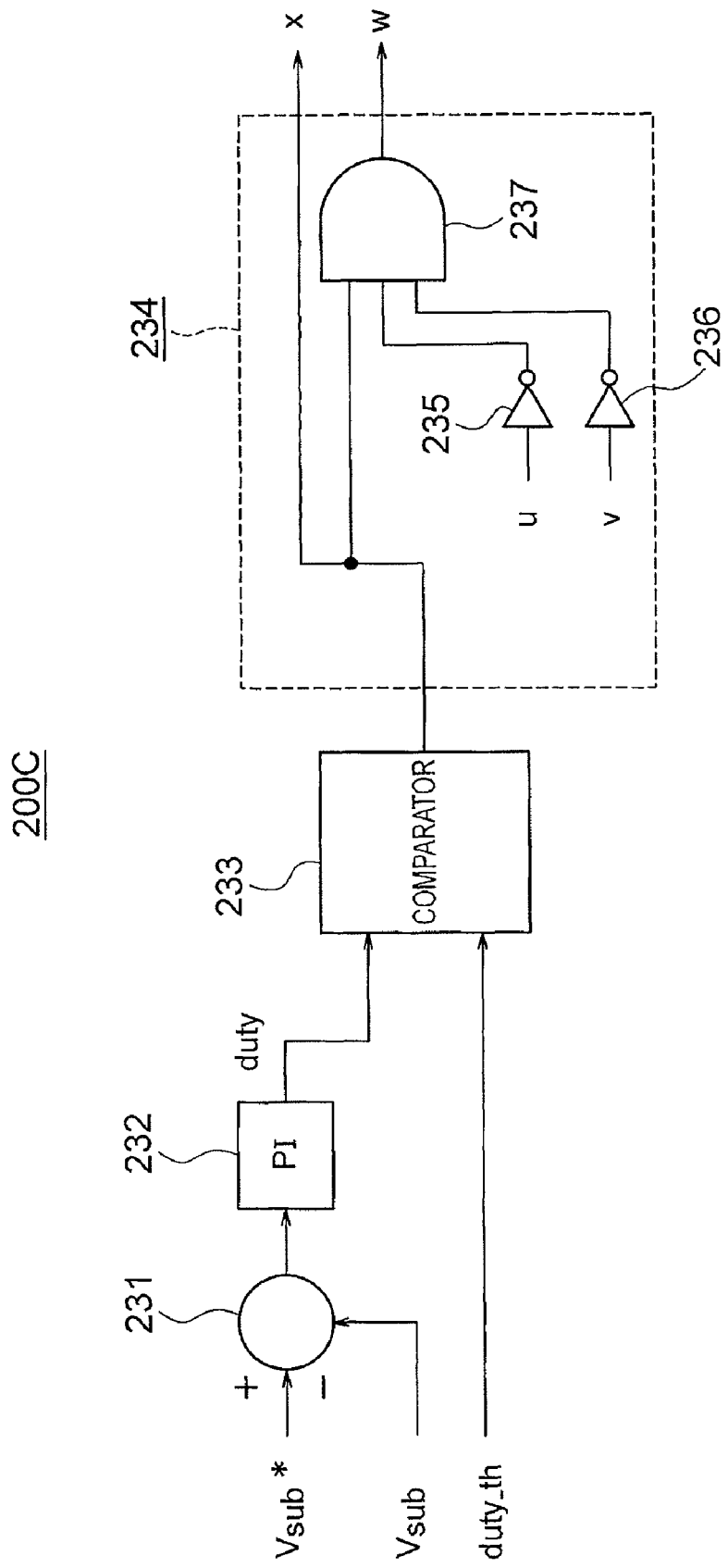
FIG. 16 illustrates a further structure of the rectification mode control circuit of the power converter according to the first embodiment of the present invention.

As illustrated in FIG. 16, even when a switching duty "duty" of the short-circuit switches 14 and 17 which is calculated based on the voltage Vsub and the target voltage Vsub* of the DC voltage source 10 by a subtracter 231 and a PI controller (PI) 232 and a duty threshold "duty_th" are used instead of the input voltage Vin and the voltage threshold Vth which are illustrated in FIG. 3, the rectification mode determination signal "x" and the rectifying switch control signal "w" may be generated, and hence the same effect is obtained.

Figure 17:
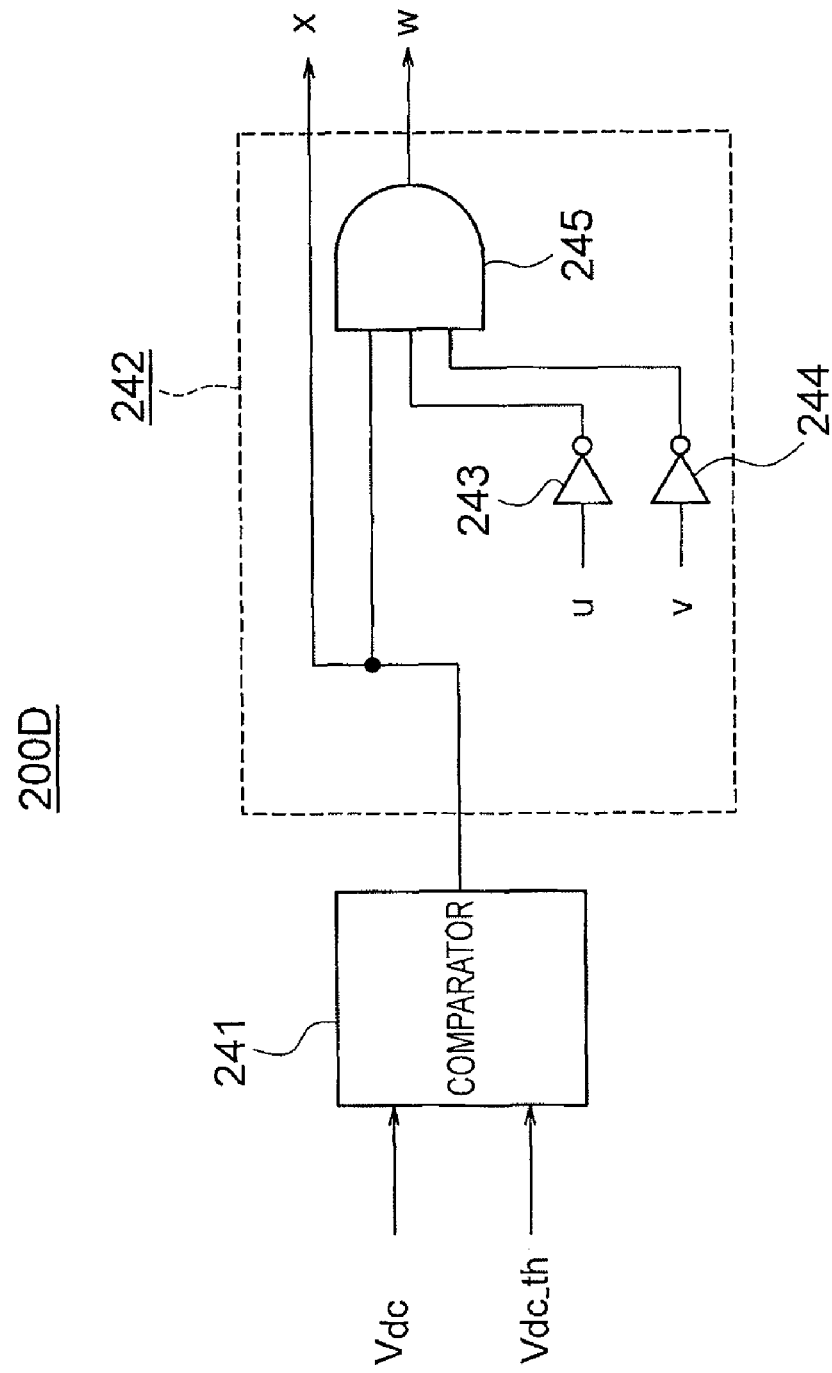
FIG. 17 illustrates a further structure of the rectification mode control circuit of the power converter according to the first embodiment of the present invention.

As illustrated in FIG. 17, even when the output voltage Vdc and an output voltage threshold Vdc_th are used instead of the input voltage Vin and the voltage threshold Vth which are illustrated in FIG. 3, the rectification mode determination signal "x" and the rectifying switch control signal "w" may be generated, and hence the same effect is obtained.

In the first embodiment, as illustrated in FIG. 4, the inverter control circuit 300 generates the target output voltage Vdc* based on the rectification mode determination signal "x" and finally generates the inverter switch control signals "q", "r", "s", and "t". As illustrated in FIG. 18, even when a target input current Iin* and the input current Iin are used instead of the target output voltage Vdc* and the output voltage Vdc which are illustrated in FIG. 4, the inverter switch control signals "q", "r", "s", and "t" may be generated, and hence the same effect is obtained. A structure located after a PI controller (PI) 325 illustrated in FIG. 18 is identical to the structure located after the PI controller 305 illustrated in FIG. 4.

Figure 19:
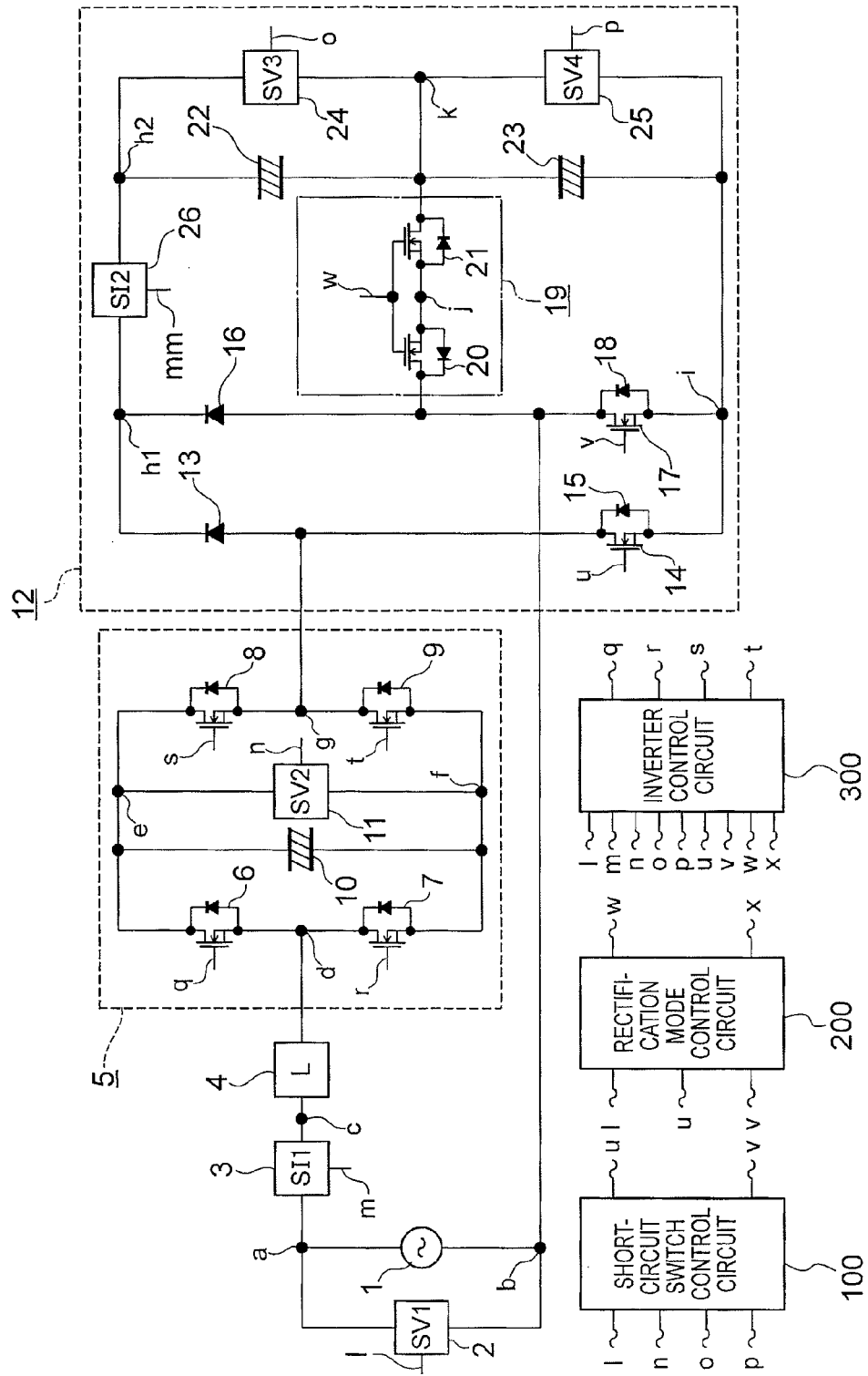
FIG. 19 is a circuit diagram illustrating another structure of the power converter according to the first embodiment of the present invention.
Figure 20:
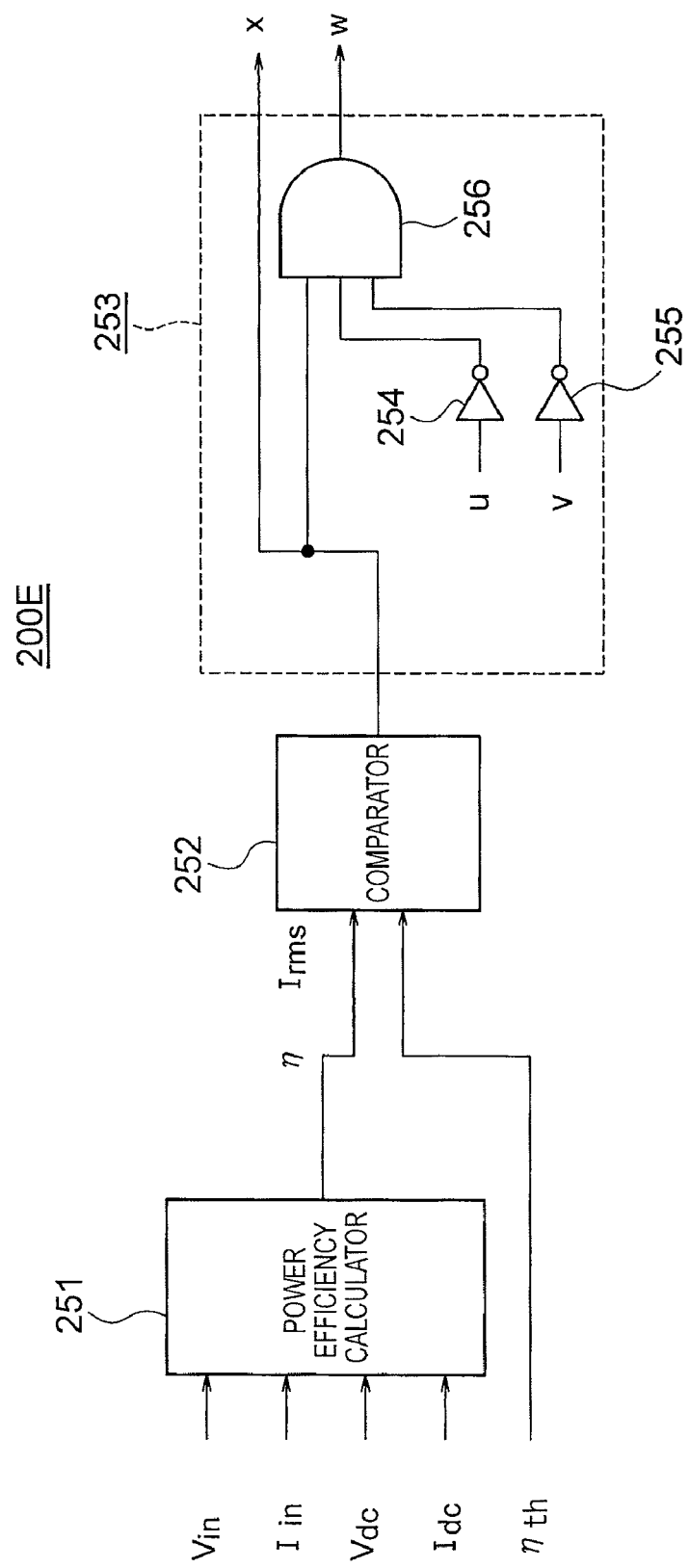
FIG. 20 illustrates a further structure of the rectification mode control circuit of the power converter according to the first embodiment of the present invention.

In a modified example of the first embodiment, as illustrated in FIG. 19, the rectifying circuit 12 further includes a current detection circuit 26. A DC current Idc flowing through the smoothing capacitors 22 and 23 is detected by the current detection circuit 26. In the first embodiment, as illustrated in FIG. 3, the rectification mode control circuit 200 generates the rectification mode determination signal "x" and the rectifying switch control signal "w" based on the input voltage Vin, the voltage threshold Vth, and the short-circuit switch control signals "u" and "v". As illustrated in FIG. 20, even when a power efficiency η calculated based on the input voltage Vin or the like by a power efficiency calculator 251 and a power efficiency threshold ηth are used instead of the input voltage Vin and the voltage threshold Vth which are illustrated in FIG. 3, the rectification mode determination signal "x" and the rectifying switch control signal "w" may be generated, and hence the same effect is obtained.

Figure 21:
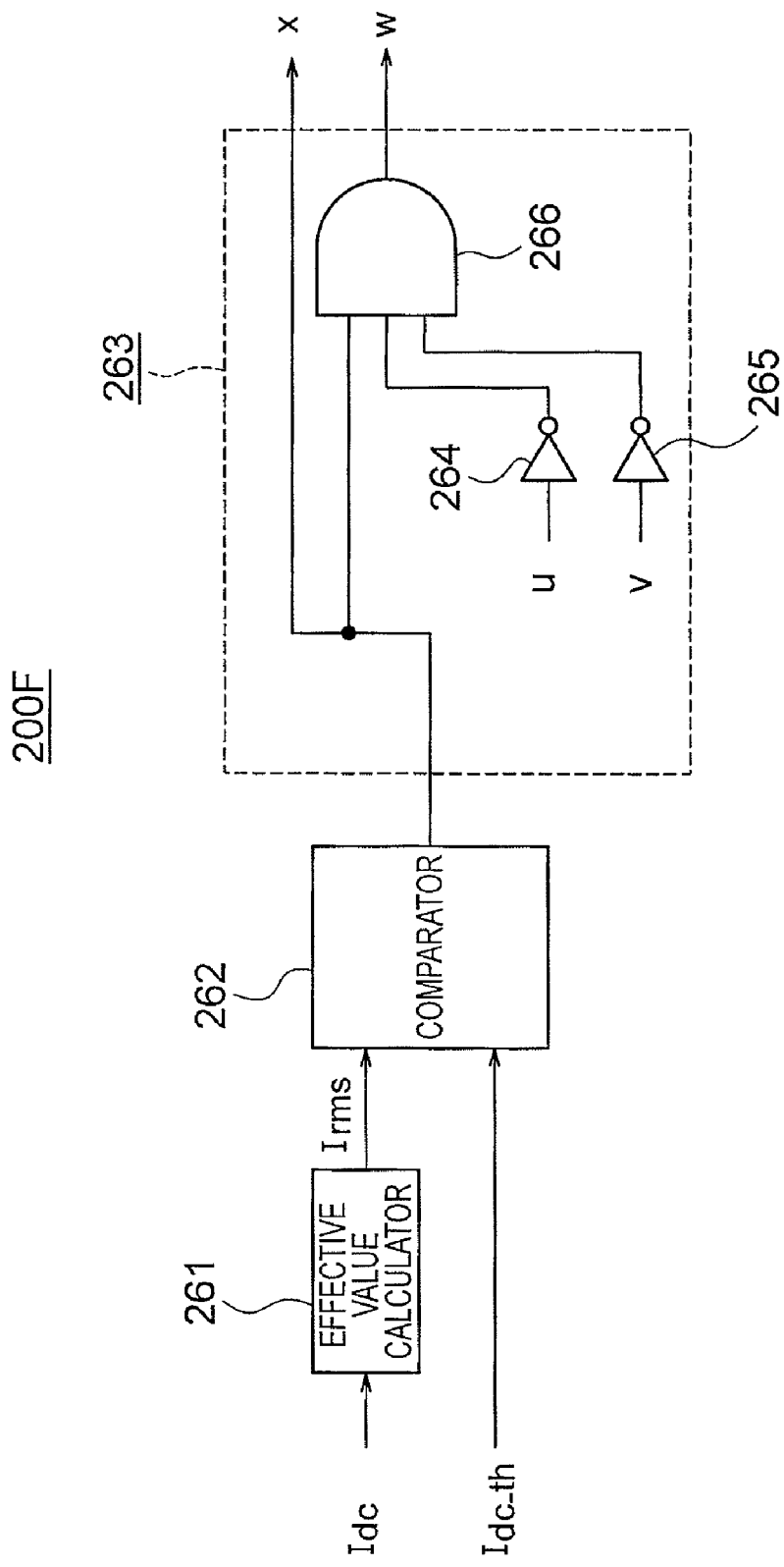
FIG. 21 illustrates a further structure of the rectification mode control circuit of the power converter according to the first embodiment of the present invention.

As illustrated in FIG. 21, even when the DC current Idc and a DC current threshold Idc_th are used instead of the input voltage Vin and the voltage threshold Vth which are illustrated in FIG. 3, the rectification mode determination signal "x" and the rectifying switch control signal "w" may be generated, and hence the same effect is obtained.

In the first embodiment, as illustrated in FIG. 4, the inverter control circuit 300 generates the target output voltage Vdc* based on the rectification mode determination signal "x" and finally generates the inverter switch control signals "q", "r", "s", and "t". As illustrated in FIG. 22, even when a target DC current Idc* and the DC current Idc are used instead of the target output voltage Vdc* and the output voltage Vdc which are illustrated in FIG. 4, the inverter switch control signals "q", "r", "s", and "t" may be generated, and hence the same effect is obtained. A structure located after a PI controller (PI) 345 illustrated in FIG. 22 is identical to the structure located after the PI controller 305 illustrated in FIG. 4.

The short-circuit switches 14 and 17 are operated only in the specific phase of the input voltage Vin from the AC power supply 1, and hence the power converter may be stably controlled and there is almost no loss caused by switching. In only the short-circuit phase range SPR of ±θ1 relative to the zero-cross phase (θ=0 or θ=π), the short-circuit switches 14 and 17 are maintained in the on state to bypass the smoothing capacitors 22 and 23. Therefore, it is unnecessary to output, to the smoothing capacitors 22 and 23, the input voltage. Vin which is in a low-voltage range, and hence the DC voltage of the inverter circuit 5 may be reduced. Thus, a high-efficiency effect and a low-noise effect are obtained with reliability.

The target output voltage Vdc* of the smoothing capacitors 22 and 23 may be controlled based on θ1 in the short-circuit phase range SPR. Therefore, the target output voltage Vdc* may be easily controlled, and hence the degree of freedom for design and control is improved.

When the short-circuit switches 14 and 17 switch the on and off states, the inverter circuit 5 is controlled to switch between the charge and discharge operations of the DC voltage source 10 by the feed forward control. Therefore, the control may be prevented from being delayed by a response time period of the feedback control, and hence high-speed control may be realized.

The current command is changed so as to control the voltage Vsub of the DC voltage source 10 to be maintained constant, and hence the power converter may be stably controlled.

The charge and discharge operations of the DC voltage source 10 may be balanced, and hence it is unnecessary to supply the DC power from an outside, to thereby simplify a device structure.

The voltage of the DC voltage source 10 may be controlled from an outside. In this case, during the output control of the inverter circuit 5, the control for maintaining the voltage Vsub constant may be unnecessary.

In the first embodiment, the peak voltage of the input voltage Vin is set to the value higher than the DC voltage Vdc of the smoothing capacitors 22 and 23, but may be set to a value lower than the DC voltage Vdc. In this case, there is no operation in the phase range of $\theta2 \leq \theta \leq \pi/2$ as described above. The DC voltage source 10 is averagely charged in the phase range of $0 \leq \theta \leq \theta1$. The DC voltage source 10 is averagely discharged in the phase range of $\theta1 \leq \theta \leq \theta2$.

In a case of $\theta1=0$, the short-circuit switches 14 and 17 may be continuously maintained in the off state. In this case, the DC voltage source 10 is averagely discharged in the phase range of $0 \leq \theta \leq \theta2$. The DC voltage source 10 is averagely charged in the phase range of $\theta2 \leq \theta \leq \pi/2$.

The reactor 4 may be connected in series in a subsequent stage of the inverter circuit 5. The short-circuit switches 14 and 17 and the rectification mode changing switches 20 and 21 are not limited to the semiconductor switch elements and may be, for example, mechanical switches.

Both the short-circuit switches 14 and 17 are maintained in the on state in the phase range of $0 \leq \theta \leq \theta1$. When the polarity of the AC power supply 1 is positive, only the short-circuit switch 14 may be maintained in the on state. When the polarity of the AC power supply 1 is negative, only the short-circuit switch 17 may be maintained in the on state. In such cases, a current flows through corresponding one of the rectifying diodes 15 and 18 which is connected to corresponding one of the short-circuit switches 14 and 17.

In the first embodiment, the cathode sides of the rectifying diodes 13 and 16 are connected to the positive electrode of the smoothing capacitor 22 located in the output stage. The cathode sides of the rectifying diodes 13 and 16 may be connected to the negative electrode side of the smoothing capacitor 23 and the anode sides thereof may be connected to the positive electrode side of the smoothing capacitor 22. In this manner, the same operation as in the first embodiment is obtained.

In the first embodiment, one end of the rectification mode changing circuit 19 is connected to the node "b", but may be connected to the node "g". In this case, when the rectification mode changing circuit 19 is in the on state and the polarity of the AC power supply 1 is positive, the control is performed so that Vdc_l follows Vdc*/2, to thereby charge the smoothing capacitor 23. In contrast to this, when the polarity of the AC power supply 1 is negative, the control is performed so that Vdc_h follows Vdc*/2, to thereby charge the smoothing capacitor 22.

Figure 23:
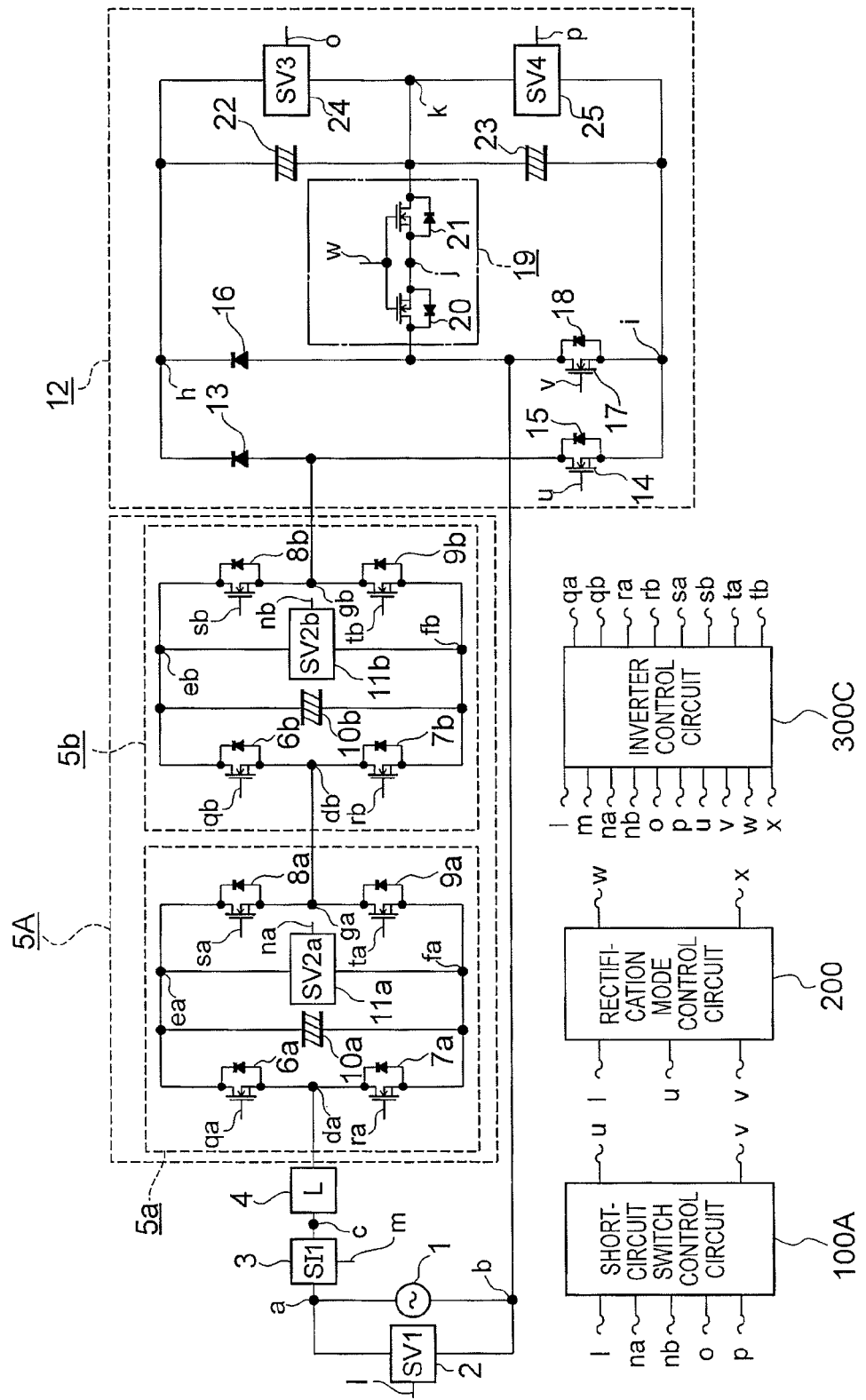
FIG. 23 is a circuit diagram illustrating still another structure of the power converter according to the first embodiment of the present invention.

In the first embodiment, the inverter circuit 5 including the single-phase inverter is described. As illustrated in FIG. 23, two single-phase inverters 5a and 5b may be connected in series to serve as an inverter circuit 5A. In this case, a sum of outputs of the respective single-phase inverters 5a and 5b corresponds to an output of the inverter circuit 5A. As in the first embodiment, the input current Iin is PWM-controlled by the inverter circuit 5A so as to make the DC voltage (output voltage) Vdc of the smoothing capacitors 22 and 23 follow the target output voltage Vdc* based on the current command Iin**, to thereby improve the input power factor from the AC power supply 1. Then, the inverter circuit 5A superimposes a generated voltage on the AC input voltage Vin. The inverter circuit 5A may output the sum of the outputs of the two single-phase inverters 5a and 5b by gradation control for generating a stepwise voltage waveform. Alternatively, only a specific single-phase inverter of the two single-phase inverters 5a and 5b may be PWM-controlled.

Second Embodiment

Figure 24:
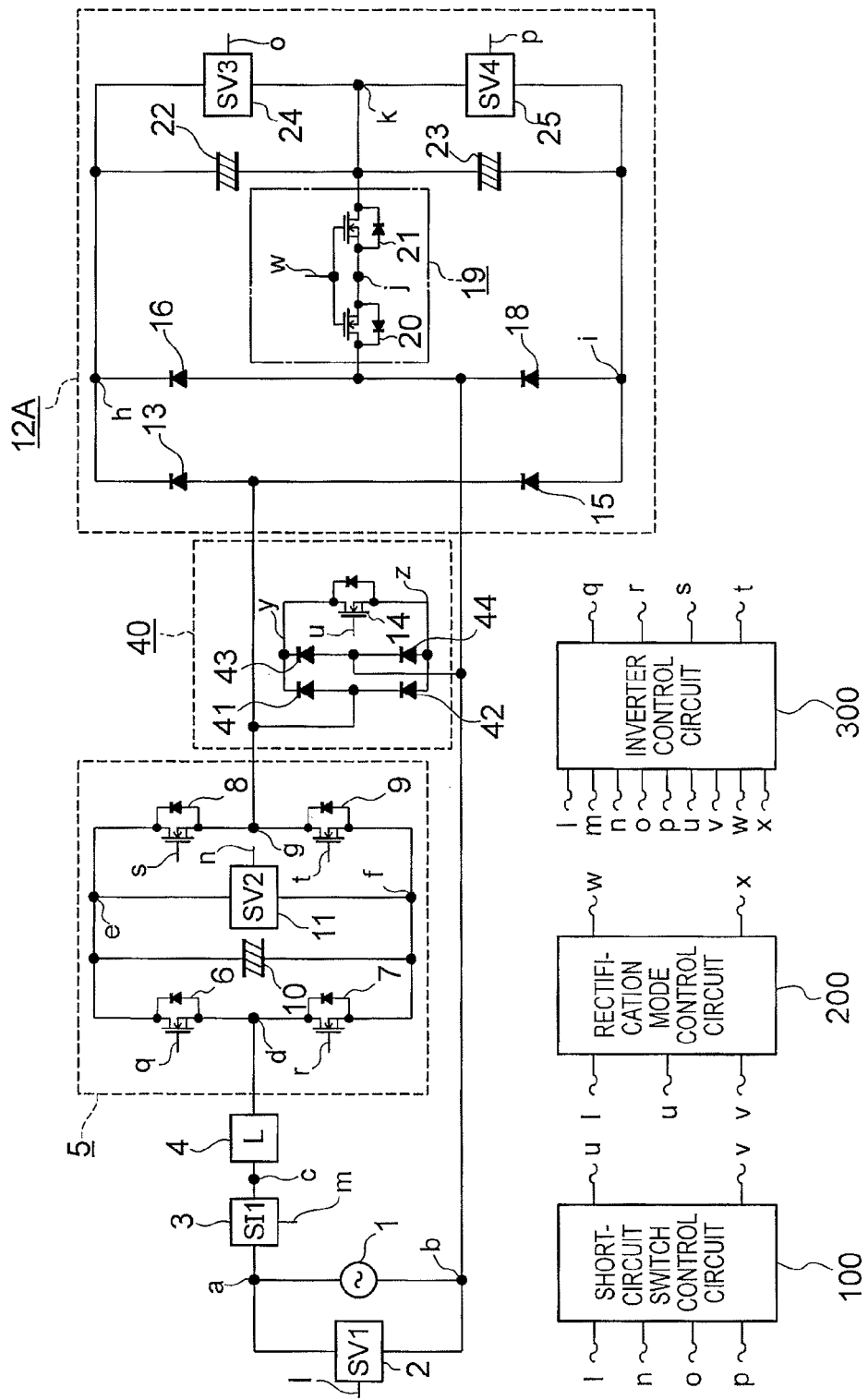
FIG. 24 is a circuit diagram illustrating a structure of a power converter according to a second embodiment of the present invention.

A power converter according to a second embodiment of the present invention is described with reference to FIGS. 24 to 26. FIG. 24 is a circuit diagram illustrating a structure of the power converter according to the second embodiment of the present invention.

In FIG. 24, the power converter according to the second embodiment of the present invention includes an AC power supply 1, a voltage detection circuit (SV1) 2, a current detection circuit (SI1) 3, a reactor (L) 4, an inverter circuit 5, a short circuit 40, a diode bridge full-wave rectifying circuit 12A, a short-circuit switch control circuit 100, a rectification mode control circuit 200, and an inverter control circuit 300.

The short circuit 40 includes a short-circuit switch 14 and diodes 41, 42, 43, and 44.

The diodes 41 and 42 are connected in series at a node "g". The diodes 43 and 44 are connected in series at a node "b". One end of the short-circuit switch 14 including a semiconductor switch element is connected to the diodes 41 and 43 at a node "y". The other end of the short-circuit switch 14 is connected to the diodes 42 and 44 at a node "z". The short-circuit switch 14 is not limited to the semiconductor switch element and may be, for example, a mechanical switch.

Unlike the rectifying circuit 12 in the first embodiment, the rectifying circuit 12A does not include the short circuit switches 14 and 17.

Next, an operation of the power converter according to the second embodiment is described with reference to the drawings.

As in the first embodiment described above, when the rectification mode changing circuit 19 is maintained in an off state by the rectification mode control circuit 200, the inverter circuit 5 causes an output voltage Vdc to follow a target output voltage Vdc*. When the rectification mode changing circuit 19 is maintained in an on state, the inverter circuit 5 causes a DC voltage Vdc_h of a smoothing capacitor 22 and a DC voltage Vdc_l of a smoothing capacitor 23 to follow Vdc*/2, which is ½ of the target output voltage. The inverter circuit 5 PWM-controls an input current Iin so that an input power factor from the AC power supply 1 is adjusted to substantially 1, and superimposes a generated voltage on an input voltage Vin from the AC power supply 1.

In only a short-circuit phase range SPR of $\pm\theta1$ relative to the zero-cross phase of the phase $\theta$ of the input voltage from the AC power supply 1, the short-circuit switch 14 is maintained in an on state by the short-circuit switch control circuit 100 to bypass the smoothing capacitors 22 and 23. Therefore, the short-circuit switch control signal (node) "v" is not used in the second embodiment.

Figure 25:
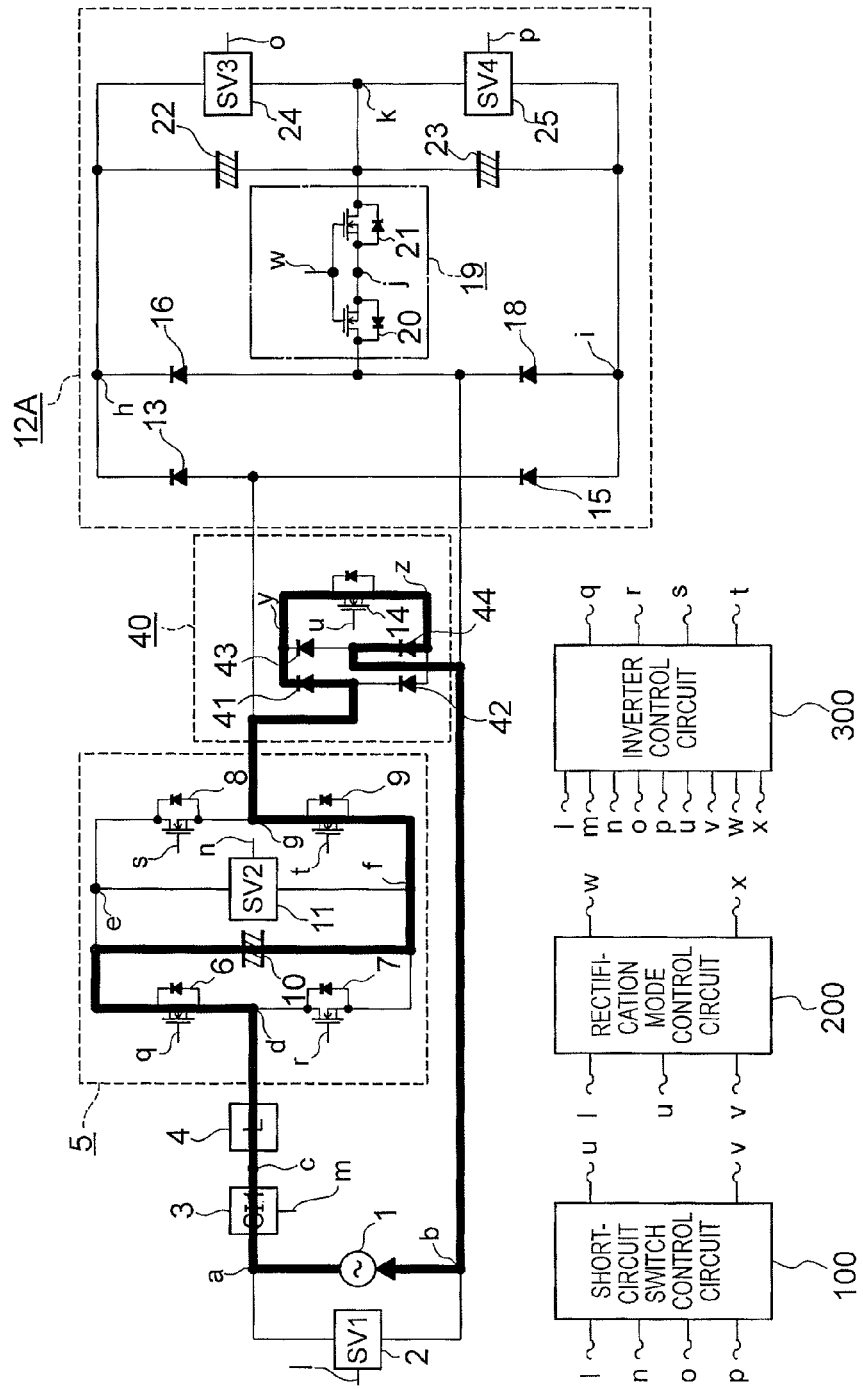
FIG. 25 illustrates an operation of the power converter according to the second embodiment of the present invention.

In the short-circuit phase range SPR, when the polarity of the AC power supply 1 is positive, as illustrated in FIG. 25, the current from the AC power supply 1 circulates through a path including the reactor 4, the inverter circuit 5, the diode 41, the short-circuit switch 14, and the diode 44 in the stated order to return to the AC power supply 1.

Figure 26:
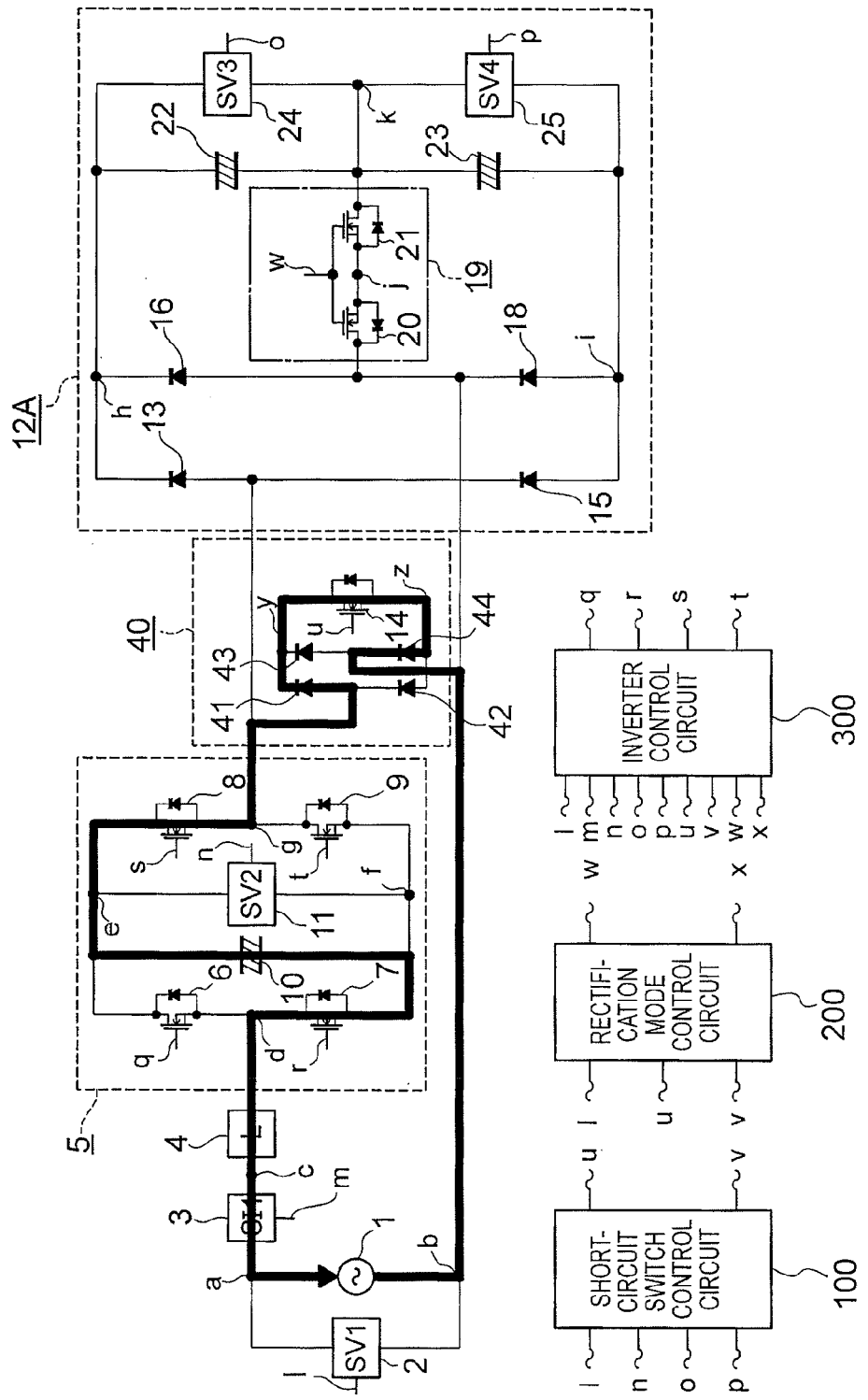
FIG. 26 illustrates another operation of the power converter according to the second embodiment of the present invention.

When the polarity of the AC power supply 1 is negative, as illustrated in FIG. 26, the current from the AC power supply 1 circulates through a path including the diode 44, the short-circuit switch 14, the diode 41, the inverter circuit 5, and the reactor 4 in the stated order to return to the AC power supply 1.

In this case, as in the first embodiment described above, energy is averagely charged in the DC voltage source 10 of the inverter circuit 5 until the short-circuit switch 14 is turned off at the phase $\theta=\theta1$.

In the second embodiment, it is unlikely to short-circuit the smoothing capacitor 23, and hence the rectification mode changing circuit 19 is controlled based on the rectifying switch control signal "w" from the rectification mode control circuit 200 without depending on the on and off states of the short-circuit switch 14. Therefore, the rectification mode control circuit 200 does not use the short-circuit switch control signals (nodes) "u" and "v".

As in the first embodiment described above, the reactor 4 may be connected in series in the subsequent stage of the inverter circuit 5. As in the modified example of the first embodiment illustrated in FIG. 19, a current detection circuit 26 is further provided in the rectifying circuit 12A. A DC current Idc flowing through the smoothing capacitors 22 and 23 is detected by the current detection circuit 26. The rectification mode control circuit of the first embodiment illustrated in any one of FIGS. 14 to 17, 20, and 21 and the inverter control circuit of the first embodiment illustrated in FIG. 18 or 22 may be applied to the second embodiment. As with the other structure illustrated in FIG. 23 according to the first embodiment, two single-phase inverters 5a and 5b may be connected in series with each other to serve as an inverter circuit 5A.

In the second embodiment, the same effect as in the first embodiment may be obtained, and the rectification mode changing circuit 19 may be controlled without depending on the on and off states of the short-circuit switch 14. Therefore, the control using the rectification mode control circuit 200 is simplified, and hence high-reliability operation may be realized.

What is claimed is:

1. A power converter, comprising:
    an AC input power supply including a first terminal and a second terminal;
    an inverter circuit including:
        an input terminal connected to the first terminal of the AC input power supply;
        an output terminal; and
        a DC voltage source which is charged and discharged based on a PWM-controlled current flowing through the DC voltage source,
        the inverter circuit superimposing a generated voltage, which is a discharge voltage of the DC voltage source, on an AC input voltage of the AC input power supply;
    a reactor connected in series in one of a preceding stage and a subsequent stage of the inverter circuit, for limiting a current;
    a rectifying circuit including:
        a first AC input terminal connected to the output terminal of the inverter circuit;
        a second AC input terminal connected to the second terminal of the AC input power supply;
        a first DC output terminal; and
        a second DC output terminal;
    a first smoothing capacitor and a second smoothing capacitor which are connected in series with each other between the first DC output terminal and the second DC output terminal of the rectifying circuit;
    a first short-circuit switch connected between the first AC input terminal and the second DC output terminal of the rectifying circuit;
    a second short-circuit switch connected between the second AC input terminal and the second DC output terminal of the rectifying circuit;
    a rectification mode changing circuit including:
        one end connected to one of the first AC input terminal and the second AC input terminal of the rectifying circuit; and
        another end connected to a connection point between the first smoothing capacitor and the second smoothing capacitor;
    a short-circuit switch control circuit for generating a short-circuit switch control signal based on the AC input voltage of the AC input power supply, the generated voltage of the DC voltage source of the inverter circuit, a voltage of the first smoothing capacitor, and a voltage of the second smoothing capacitor to control an on state and an off state of each of the first short-circuit switch and on and off states of the second short-circuit switch based on the short-circuit switch control signal, the short-circuit switch control circuit generating the short-circuit switch control signal to maintain the first short-circuit switch and the second short-circuit switch in the on state in a short-circuit phase range in which a phase of the AC input voltage is within plus or minus a predetermined phase relative to zero;
    a rectification mode control circuit for generating a rectifying switch control signal to control an on state and an off state of the rectification mode changing circuit based on the rectifying switch control signal; and
    an inverter control circuit for generating an inverter switch control signal based on the AC input voltage and an AC input current of the AC input power supply, the voltage of the first smoothing capacitor, the voltage of the second smoothing capacitor, the short-circuit switch control signal from the short-circuit switch control circuit, and the rectifying switch control signal from the rectification mode control circuit to PWM-control the AC input current flowing through the inverter circuit based on the inverter switch control signal so that an output voltage from the rectifying circuit follows a target output voltage and an input power factor from the AC input power supply is adjusted to 1.

2. A power converter according to claim 1, wherein the rectification mode control circuit generates the rectifying switch control signal based on the AC input voltage of the AC input power supply and the short-circuit switch control signal from the short-circuit switch control circuit.

3. A power converter according to claim 2, wherein the rectification mode control circuit generates the rectifying switch control signal having a phase opposite to the short-circuit switch control signal in the short-circuit phase range to maintain the rectification mode changing circuit in the off state.

4. A power converter according to claim 2, wherein the rectification mode control circuit generates the rectifying switch control signal based on the AC input current of the AC input power supply and the short-circuit switch control signal from the short-circuit switch control circuit, instead of the AC input voltage of the AC input power supply and the short-circuit switch control signal from the short-circuit switch control circuit.

5. A power converter according to claim 2, wherein the rectification mode control circuit generates the rectifying switch control signal based on the AC input voltage and the AC input current of the AC input power supply and the short-circuit switch control signal from the short-circuit switch control circuit, instead of the AC input voltage of the AC input power supply and the short-circuit switch control signal from the short-circuit switch control circuit.

6. A power converter according to claim 2, wherein the rectification mode control circuit generates the rectifying switch control signal based on the generated voltage of the DC voltage source of the inverter circuit and the short-circuit switch control signal from the short-circuit switch control circuit, instead of the AC input voltage of the AC input power supply and the short-circuit switch control signal from the short-circuit switch control circuit.

7. A power converter according to claim 2, wherein the rectification mode control circuit generates the rectifying switch control signal based on the voltage of the first smoothing capacitor, the voltage of the second smoothing capacitor, and the short-circuit switch control signal from the short-circuit switch control circuit, instead of the AC input voltage of the AC input power supply and the short-circuit switch control signal from the short-circuit switch control circuit.

8. A power converter according to claim 2, wherein the inverter control circuit generates the inverter switch control signal based on the AC input voltage and the AC input current of the AC input power supply, the short-circuit switch control signal from the short-circuit switch control circuit, and the rectifying switch control signal from the rectification mode control circuit, instead of the AC input voltage and the AC input current of the AC input power supply, the voltage of the first smoothing capacitor, the voltage of the second smoothing capacitor, the short-circuit switch control signal from the short-circuit switch control circuit, and the rectifying switch control signal from the rectification mode control circuit.

9. A power converter according to claim 2, wherein the rectification mode control circuit generates the rectifying switch control signal based on the AC input voltage and the AC input current of the AC input power supply, the voltage of the first smoothing capacitor, the voltage of the second smoothing capacitor, a DC current flowing through the first smoothing capacitor and the second smoothing capacitor, and the short-circuit switch control signal from the short-circuit switch control circuit, instead of the AC input voltage of the AC input power supply and the short-circuit switch control signal from the short-circuit switch control circuit.

10. A power converter according to claim 2, wherein the rectification mode control circuit generates the rectifying switch control signal based on a DC current flowing through the first smoothing capacitor and the second smoothing capacitor, and the short-circuit switch control signal from the short-circuit switch control circuit, instead of the AC input voltage of the AC input power supply and the short-circuit switch control signal from the short-circuit switch control circuit.

11. A power converter according to claim 2, wherein the inverter control circuit generates the inverter switch control signal based on the AC input voltage and the AC input current of the AC input power supply, a DC current flowing through the first smoothing capacitor and the second smoothing capacitor, the short-circuit switch control signal from the short-circuit switch control circuit, and the rectifying switch control signal from the rectification mode control circuit, instead of the AC input voltage and the AC input current of the AC input power supply, the voltage of the first smoothing capacitor, the voltage of the second smoothing capacitor, the short-circuit switch control signal from the short-circuit switch control circuit, and the rectifying switch control signal from the rectification mode control circuit.

12. A power converter according to claim 2, wherein the inverter circuit comprises a first single-phase inverter and a second single-phase inverter which are connected in series.

13. A power converter, comprising:
an AC input power supply including a first terminal and a second terminal;
an inverter circuit including:
    an input terminal connected to the first terminal of the AC input power supply;
    an output terminal; and
    a DC voltage source which is charged and discharged based on a PWM-controlled current flowing through the DC voltage source,
the inverter circuit superimposing a generated voltage, which is a discharge voltage of the DC voltage source, on an AC input voltage of the AC input power supply;
a reactor connected in series in one of a preceding stage and a subsequent stage of the inverter circuit, for limiting a current;
a rectifying circuit including:
    a first AC input terminal connected to the output terminal of the inverter circuit;
    a second AC input terminal connected to the second terminal of the AC input power supply;
    a first DC output terminal; and
    a second DC output terminal;
a first smoothing capacitor and a second smoothing capacitor which are connected in series with each other between the first DC output terminal and the second DC output terminal of the rectifying circuit;
a short circuit connected between the first AC input terminal and the second AC input terminal of the rectifying circuit;
a rectification mode changing circuit including:
    one end connected to one of the first AC input terminal and the second AC input terminal of the rectifying circuit; and
    another end connected to a connection point between the first smoothing capacitor and the second smoothing capacitor;
a short-circuit switch control circuit for generating a short-circuit switch control signal based on the AC input voltage of the AC input power supply, the generated voltage of the DC voltage source of the inverter circuit, a voltage of the first smoothing capacitor, and a voltage of the second smoothing capacitor to control an on state and an off state of the short circuit based on the short-circuit switch control signal, the short-circuit switch control circuit generating the short-circuit switch control signal to maintain the short circuit in the on state in a short-circuit phase range in which a phase of the AC input voltage is within plus or minus a predetermined phase relative to zero;
a rectification mode control circuit for generating a rectifying switch control signal to control an on state and an off state of the rectification mode changing circuit based on the rectifying switch control signal; and
an inverter control circuit for generating an inverter switch control signal based on the AC input voltage and an AC input current of the AC input power supply, the voltage of the first smoothing capacitor, the voltage of the second smoothing capacitor, the short-circuit switch control signal from the short-circuit switch control circuit, and the rectifying switch control signal from the rectification mode control circuit to PWM-control the AC input current flowing through the inverter circuit based on the inverter switch control signal so that an output voltage from the rectifying circuit follows a target output voltage and an input power factor from the AC input power supply is adjusted to 1.

14. A power converter according to claim 13, wherein the rectification mode control circuit generates the rectifying switch control signal based on the AC input voltage of the AC input power supply and the short-circuit switch control signal from the short-circuit switch control circuit.

15. A power converter according to claim 14, wherein the rectification mode control circuit generates the rectifying switch control signal based on the AC input current of the AC input power supply and the short-circuit switch control signal from the short-circuit switch control circuit, instead of the AC input voltage of the AC input power supply and the short-circuit switch control signal from the short-circuit switch control circuit.

16. A power converter according to claim 14, wherein the rectification mode control circuit generates the rectifying switch control signal based on the AC input voltage and the AC input current of the AC input power supply and the short-circuit switch control signal from the short-circuit switch control circuit, instead of the AC input voltage of the AC input power supply and the short-circuit switch control signal from the short-circuit switch control circuit.

17. A power converter according to claim 14, wherein the rectification mode control circuit generates the rectifying switch control signal based on the generated voltage of the DC voltage source of the inverter circuit and the short-circuit switch control signal from the short-circuit switch control circuit, instead of the AC input voltage of the AC input power supply and the short-circuit switch control signal from the short-circuit switch control circuit.

18. A power converter according to claim 14, wherein the rectification mode control circuit generates the rectifying switch control signal based on the voltage of the first smoothing capacitor, the voltage of the second smoothing capacitor, and the short-circuit switch control signal from the short-circuit switch control circuit, instead of the AC input voltage of the AC input power supply and the short-circuit switch control signal from the short-circuit switch control circuit.

19. A power converter according to claim 14, wherein the inverter control circuit generates the inverter switch control signal based on the AC input voltage and the AC input current of the AC input power supply, the short-circuit switch control signal from the short-circuit switch control circuit, and the rectifying switch control signal from the rectification mode control circuit, instead of the AC input voltage and the AC input current of the AC input power supply, the voltage of the first smoothing capacitor, the voltage of the second smoothing capacitor, the short-circuit switch control signal from the short-circuit switch control circuit, and the rectifying switch control signal from the rectification mode control circuit.

20. A power converter according to claim 14, wherein the rectification mode control circuit generates the rectifying switch control signal based on the AC input voltage and the AC input current of the AC input power supply, the voltage of the first smoothing capacitor, the voltage of the second smoothing capacitor, a DC current flowing through the first smoothing capacitor and the second smoothing capacitor, and the short-circuit switch control signal from the short-circuit switch control circuit, instead of the AC input voltage of the AC input power supply and the short-circuit switch control signal from the short-circuit switch control circuit.

21. A power converter according to claim 14, wherein the rectification mode control circuit generates the rectifying switch control signal based on a DC current flowing through the first smoothing capacitor and the second smoothing capacitor, and the short-circuit switch control signal from the short-circuit switch control circuit, instead of the AC input voltage of the AC input power supply and the short-circuit switch control signal from the short-circuit switch control circuit.

22. A power converter according to claim 14, wherein the inverter control circuit generates the inverter switch control signal based on the AC input voltage and the AC input current of the AC input power supply, a DC current flowing through the first smoothing capacitor and the second smoothing capacitor, the short-circuit switch control signal from the short-circuit switch control circuit, and the rectifying switch control signal from the rectification mode control circuit, instead of the AC input voltage and the AC input current of the AC input power supply, the voltage of the first smoothing capacitor, the voltage of the second smoothing capacitor, the short-circuit switch control signal from the short-circuit switch control circuit, and the rectifying switch control signal from the rectification mode control circuit.

23. A power converter according to claim 14, wherein the inverter circuit comprises a first single-phase inverter and a second single-phase inverter which are connected in series.

* * * * *